United States Patent
Mateti et al.

(10) Patent No.: US 9,462,264 B2
(45) Date of Patent: Oct. 4, 2016

(54) CHARACTERIZATION AND EVALUATION OF OPTICAL ELEMENTS UNDER VIBRATIONAL LOADING

(71) Applicant: The United States of America as represented by the Secretary of the Navy, Washington, DC (US)

(72) Inventors: Kiron Mateti, Bloomington, IN (US); Craig Armes, Washington, IN (US); Aaron Cole, Bloomington, IN (US); Josh Borneman, Bloomington, IN (US); Amanda Lin, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/820,799

(22) Filed: Aug. 7, 2015

(65) Prior Publication Data
US 2016/0255341 A1    Sep. 1, 2016

Related U.S. Application Data

(63) Continuation-in-part of application No. 14/803,018, filed on Jul. 17, 2015.

(60) Provisional application No. 62/126,118, filed on Feb. 27, 2015.

(51) Int. Cl.
| | |
|---|---|
| *H04N 17/00* | (2006.01) |
| *G06T 5/00* | (2006.01) |
| *H04N 5/225* | (2006.01) |
| *G06T 7/20* | (2006.01) |

(52) U.S. Cl.
CPC ............ *H04N 17/002* (2013.01); *G06T 5/006* (2013.01); *G06T 7/2033* (2013.01); *H04N 5/2256* (2013.01); *G06T 2207/10004* (2013.01); *G06T 2207/20201* (2013.01)

(58) Field of Classification Search
CPC .............................................. G01M 7/00–7/08
See application file for complete search history.

(56) References Cited

U.S. PATENT DOCUMENTS

| | | |
|---|---|---|
| 6,461,040 B1 | 10/2002 | Mattson et al. |
| 7,787,131 B1 | 8/2010 | Moran |
| 2011/0181741 A1* | 7/2011 | Luneau ................. G01M 7/022 348/208.4 |
| 2013/0043400 A1 | 2/2013 | Nakatsugawa et al. |
| 2014/0331774 A1* | 11/2014 | Ohara ................. H04N 5/23248 73/662 |

* cited by examiner

*Primary Examiner* — Michael Teitelbaum
(74) *Attorney, Agent, or Firm* — Christopher A. Monsey

(57) ABSTRACT

Systems and related methods are provided to perform optical characterization of system under tests (SUT), including one or more optical elements (OE), for various purposes including evaluation of optical resolution needed to distinguish image elements, blur, line of sight jitter, and/or pointing stability. Various testing systems and methods are provided including an embodiment having a vibration loading system (VLS), a first acceleration sensor coupled with the VLS, and a mounting structure adapted to receive the SUT. An illumination target system (ITS) emits light that passes through the SUT OE's lens and is captured by the SUT's imaging system. A light control system controls the ITS based on a plurality of activation commands and a Test Control System (TCS). The TCS receives ITS input through the SUT that is synchronized with acceleration sensor data (e.g. phase of VLS position) and analyzed via real-time or post-processing including image distortion analysis.

25 Claims, 27 Drawing Sheets

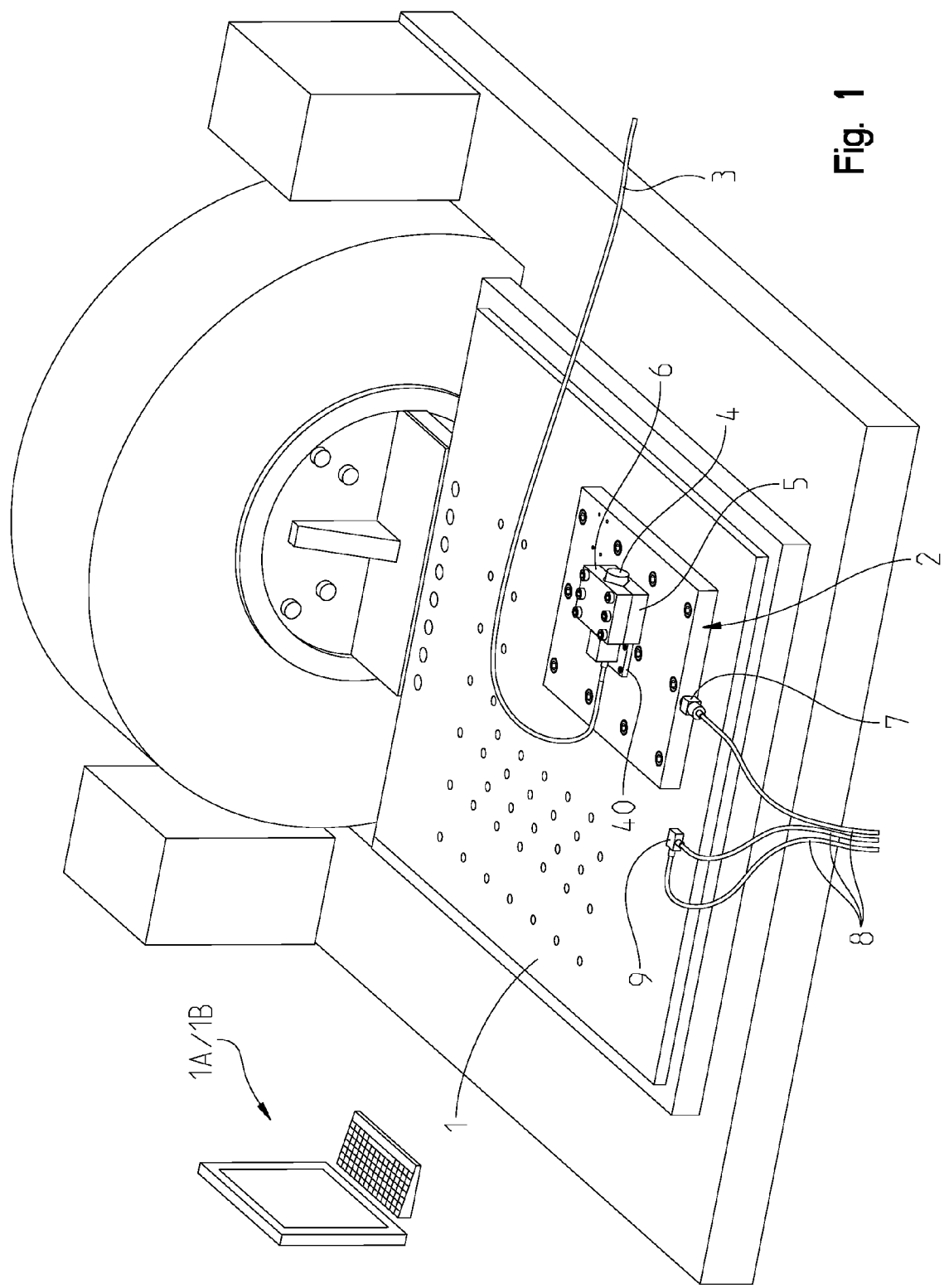

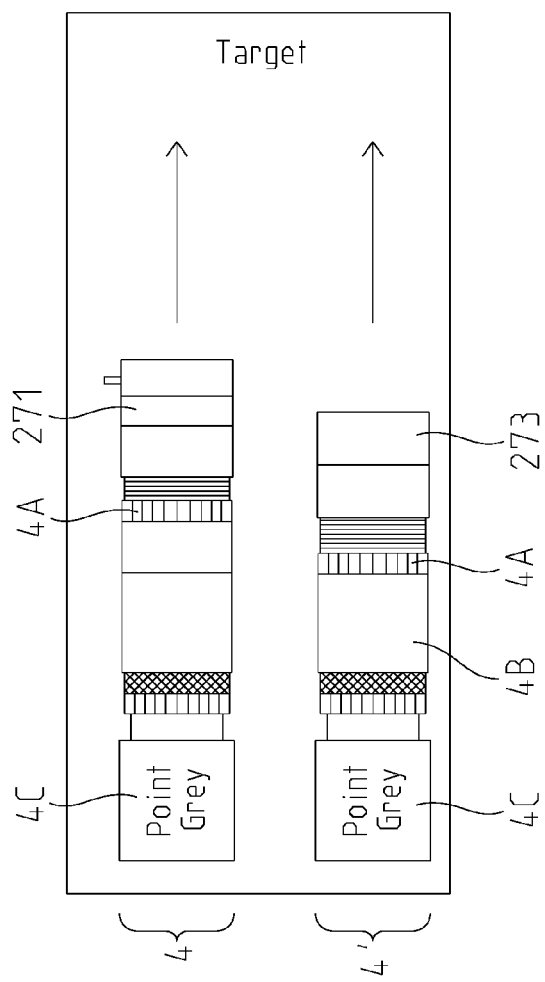
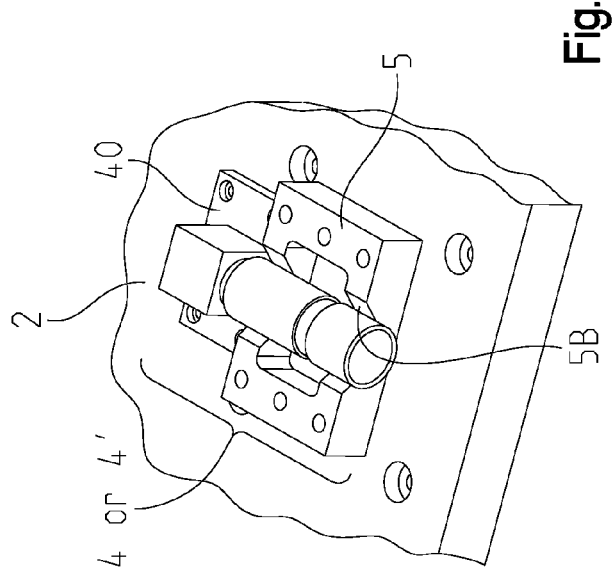
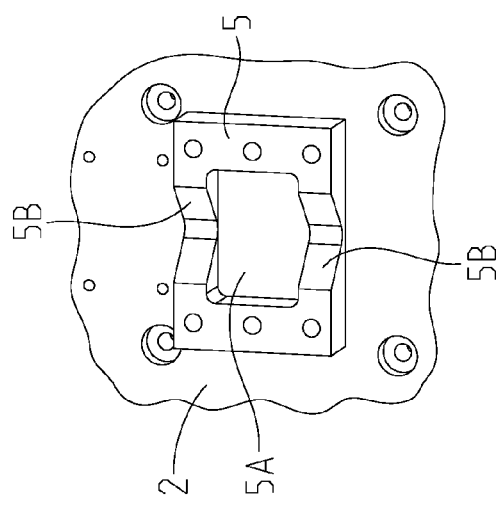

User Inputs to Computers 1A and/or 51A

| Inputs | Description |
|---|---|
| Freqs | Vector of commanded vibration frequencies of vibration table (one or more) |
| Dwell_Times | Vector of time to vibrate at each Freqs (one or more) |
| Amplitudes | Vector of commanded acceleration amplitude for controlling the vibration table 1 for each frequency (one or more) |
| Phases | Vector of commanded phase point to start and execute the test image strobe (e.g., vibrating table at 100hz - user input Phases of the LED strobe with respect to table acceleration can be 0, 90, 180, and 270 degrees) - can be one or multiple phase values |
| Pulse_Widths | Vector of the pulse width of the test image strobe duration (one or more) |
| Frame_Rates | Vector of the camera frame rate for each frequency (one or more) |
| Black_Levels | Vector of the camera black level adjustment for each frequency (one or more) |

101 — Freqs
103 — Dwell_Times
105 — Amplitudes
107 — Phases
109 — Pulse_Widths
111 — Frame_Rates
113 — Black_Levels

Fig. 9

Outputs

| | Outputs | Description |
|---|---|---|
| 501 | Filename.avi | Video with filename <lens>_<freq>_<phase>_<acc>_<fps>_<pw>_<bl>.avi |
| 503 | Lens | Type of lens |
| 505 | freq | Commanded vibration frequency |
| 507 | phase | Commanded phase point of the test image strobe |
| 509 | acc | Measured acceleration amplitude |
| 511 | pw | Pulse width of the test image strobe duration |
| 513 | fps | Camera frame rate for each frequency |
| 515 | bl | Black level adjustment for each frequency |
| 517 | LSF | Line Spread Function plot 235 on GUI (see Fig. 12) |
| 519 | ESF | Edge Spread Function plot 233 on GUI (see Fig. 12) |
| 521 | MTF | Modulation Transfer Function 237 on GUI (see Fig. 12) |

Fig. 10

From Fig. 11C

Generate a distortion analysis output using, e.g., average or mean squared of DMR 700 results from Step 707 versus vibration frequency (e.g., DC to 2 kHz) to analyze effect of relative motion within SUT 4. Another embodiment can show a comparison of effect of relative motion within SUT 4 by producing an output comprising a comparison of a said DRM results (e.g., percentage of displacement or difference from actual position of grid dots and "should be" (or known good) or predicted position for one, some or each grid dot) compared to a distortion or warping tolerance in certain applications such as ability to distinguish objects at a certain distance or a loss in resolution value when an image is captured by a camera. In some examples, a system or method can use DMR 700 results from Step 707 to create an analytical output, e.g., a DMR graph data shown as a function of vibration frequency (e.g., DC to 2 kHz) to analyze effect of relative motion within SUT Other distortion analysis are possible such as, e.g., correlating distortion mapping with structural modes of vibration that impact or create optical effects (e.g., distortion in different directions.)

Fig. 11D     711

CHARACTERIZATION AND EVALUATION OF OPTICAL ELEMENTS UNDER VIBRATIONAL LOADING

CROSS-REFERENCE TO RELATED APPLICATIONS

The present application is a Continuation-in-Part of U.S. patent application Ser. No. 14/803,018, filed Jul. 17, 2015, entitled "CHARACTERIZATION AND EVALUATION OF OPTICAL ELEMENTS UNDER VIBRATIONAL LOADING," which claims priority to U.S. Patent Application Ser. No. 62/126,118, filed Feb. 27, 2015, entitled "SYSTEM AND METHOD FOR IMPROVING CHARACTERIZATION AND EVALUATION OF OPTICAL ELEMENTS UNDER VIBRATIONAL LOADING INCLUDING IMAGING, ILLUMINATION CONTROL, SENSORS, AND TEST CONTROL SYSTEMS AND PROCESSES," the disclosures of which are expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,262) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention addresses a need for characterizing responses of optical systems and elements, such as liquid-based optics, to various types of vibrational loading. Vibration can negatively impact performance of optical systems used in applications such as imaging, laser pointing, and laser designation. Typically, for an imaging application, a lens or system of lenses is used with a camera system. During an exposure, where light is being collected by a camera mounted on a platform, if either the platform or an object being imaged (i.e. target) move, a resulting image may be blurred as a function of exposure time of a camera system and relative motion between platform and target. If every element in an imaging system moves together along with a stationary target, a resulting image will be clear. However, within a camera system, if there is relative motion of a lens, a camera element, or an imaging system's target, a resulting image will suffer blurring. Liquid lenses (e.g. electrowetting based liquid lenses, or pressure membrane liquid lenses, etc.) provide enhanced capability over solid lenses by the ability to change focus or tilt using voltage without conventional mechanical elements. Despite this advantage, liquid lenses can suffer from undesirable effects due to vibration such as resonant modes at frequencies dependent on geometrical and material properties. One approach to reducing such undesirable responses to vibration is to reduce the size of a liquid lens. However, light collection and imaging capabilities are reduced as size of the optical element (i.e. aperture) is reduced, thus limiting ability to use such lenses. When comparing image quality produced through an optical element (e.g. a glass, plastic, or a liquid lens system), there can be issues differentiating between blur caused by external vibrations of base equipment and blur caused by structural bending or displacement of optical elements (e.g. bending resonance mode in a glass lens, or shifting of liquids within a liquid lens). Typically in some cases (e.g. for liquid lenses), an assumption can be made that surface tension is much higher than any sort of vibration effects, so any deformation, and thus degradation in optical performance, caused by vibrations can be neglected. However, no capability exists that characterizes vibration effects for optical systems that may be sensitive to vibration (e.g. liquid lenses). Thus, a need exists to determine if a particular optical imaging system design will function in a particular end application or environment relative to expected vibrational loading associated with that application or environment.

Systems and related methods are provided to perform optical characterization of system under tests (SUT), including one or more optical elements (OE), for various purposes including evaluation of optical resolution needed to distinguish image elements, blur, line of sight jitter, and/or pointing stability. Various testing systems and methods are provided including an embodiment having a vibration loading system (VLS), a first acceleration sensor coupled with the VLS, and a mounting structure adapted to receive the SUT. An illumination target system (ITS) emits light that passes through the SUT OE's lens and is captured by the SUT's imaging system. A light control system controls the ITS based on a plurality of activation commands and a Test Control System (TCS). The TCS receives ITS input through the SUT that is synchronized with acceleration sensor data (e.g. phase of VLS position) and analyzed via real-time or post processing.

One type or example of post processing can include modulation transfer function (MTF) processing which generally can include embodiments to measures optical resolution as a function of vibration frequency which can be used to determine performance of optical elements during vibration loading, e.g. blur. An additional post-processing approach can include distortion mapping, which allows analysis of vibration induced geometric aberrations as represented in a data image. For example, if a set of equally spaced dots forming a grid pattern were imaged and no distortion were present, the recorded image would also be equally spaced dots forming a grid pattern. If distortion were present, however, the exemplary recorded image would have non-equally spaced dots that form an alternative pattern that can be measured and quantified to form a mapping from the original equal spacing to the alternative pattern. This exemplary measurement method can be used to determine whether structural displacement in an optical element causes optical performance issues. This additional exemplary post-processing approach can be used separately or in addition to other post processing including MTF post processing.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 1 shows a perspective view of a VLS with a mounting apparatus for a SUT in accordance with an exemplary embodiment of the invention;

FIG. 1A shows an exemplary SUT (e.g. a camera with optics) used with an exemplary embodiment of the invention;

FIG. 1B shows an exemplary lower clamp for holding an exemplary SUT such as, e.g., shown in FIG. 1A showing a cavity for an moveable element, e.g., focus adjustment ring, of the exemplary SUT;

FIG. 1C shows a perspective view of the FIG. 1B exemplary lower clamp holding an exemplary SUT such as, e.g., shown in FIG. 1A;

FIG. 9 shows a table of some user inputs in accordance with one embodiment of the invention;

FIG. 10 shows a table of some outputs in accordance with one embodiment of the invention;

FIGS. 11C and 11D show an exemplary simplified process or method of distortion mapping post processing analysis of outputs associated with an alternative embodiment of the invention;

DETAILED DESCRIPTION OF THE DRAWINGS

Figure 2:
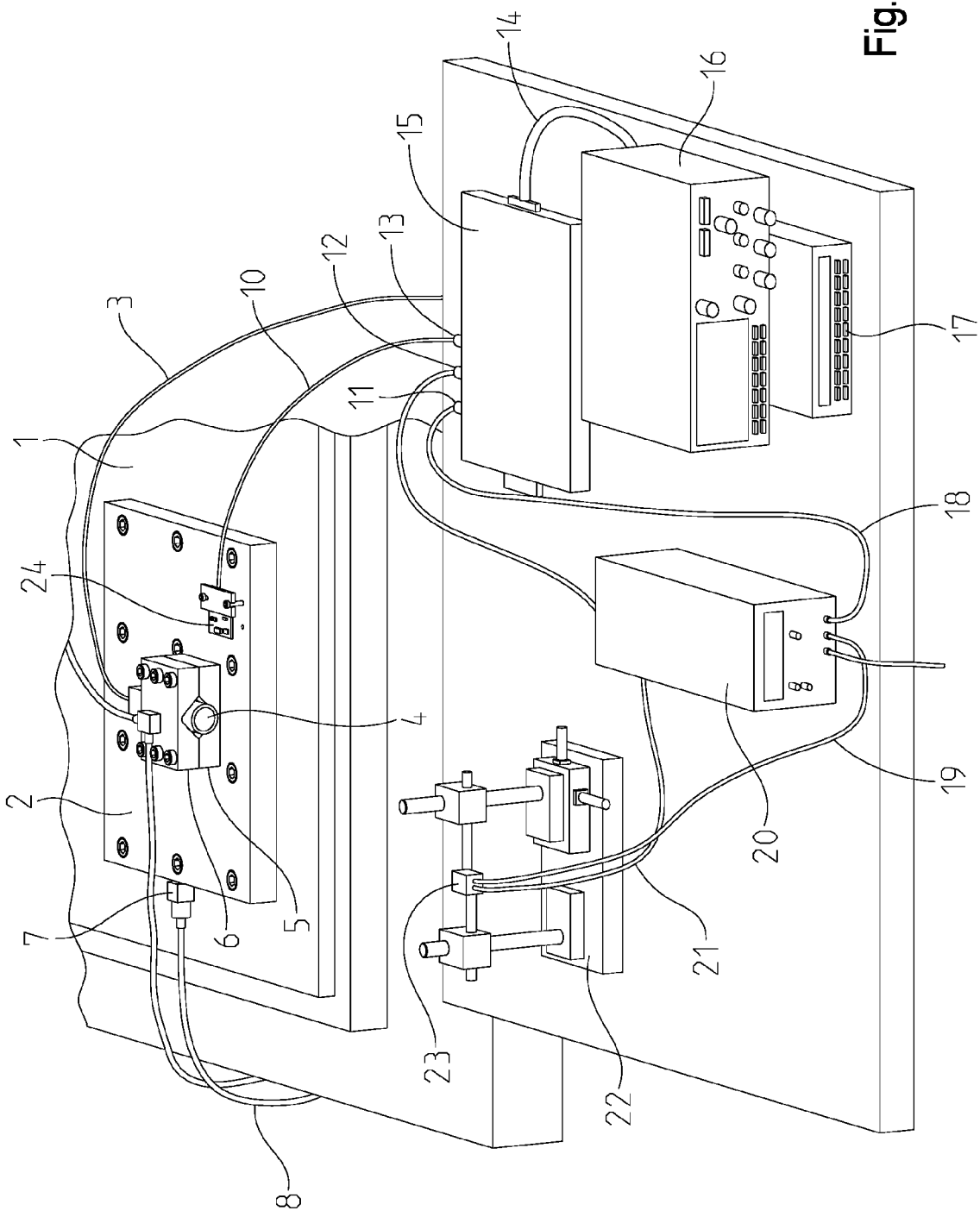
FIG. 2 shows a perspective view of an ITS used in conjunction with the SUT to measure optical characteristics of an exemplary optic element.

The embodiments of the invention described herein are not intended to be exhaustive or to limit the invention to precise forms disclosed. Rather, the embodiments selected for description have been chosen to enable one skilled in the art to practice the invention.

Referring to FIG. 1, an exemplary test system is shown that can be used with an exemplary SUT 4, e.g., a camera with lens that is mounted onto an exemplary Vibrational Table 1. An Adapter Plate 2 houses a SUT 4 clamped via a Mounting Plate 40, a Lower Clamp 5, and an Upper Clamp 6. SUT 4 is connected to an Electro-Optics Control Computer (EOCC) (not shown, however, e.g., see FIGS. 2A and 2B, 51) via a USB 3.0 cable 3. An Accelerometer Sensor 7 is used as part of a vibration table feedback control system while another Accelerometer Sensor 9 is used for data collection and ITS synchronization in accordance with the invention, while both can be connected via Accelerometer Cabling 8 to Accelerometer Amplifiers (not shown; e.g., see FIGS. 2A and 2B, 53A). The Accelerometer Amplifiers (not shown; see e.g., FIGS. 2A and 2B, 53A) are in turn connected to and provide amplified signals to a Vibration Table Controller 1B.

FIG. 1A shows an exemplary SUT 4 (e.g. a camera with optics such as a camera optics system) used with an exemplary embodiment of the invention. In particular, FIG. 1A embodiments show two SUTs 4, 4' having an adjustable element, e.g., a Focus Adjustment Ring 4A, Tube 4B, and Camera or Imaging System 4C. An embodiment, e.g., SUT 4, can also include a reference, e.g., glass lens 271; another embodiment can include a SUT 4' with a liquid lens 273. Embodiments can include an SUT 4 or a SUT with an electrical system such as, e.g., an automated Focus Adjustment Ring. FIG. 1B shows an exemplary Lower Clamp 5 (e.g. see FIG. 1) for holding an exemplary SUT such as, e.g., SUT 4 such as shown in FIG. 1A showing an Adjustable Element Receiving Cavity 5A for an adjustable element of the SUT 4 e.g., a Focus Adjustment Ring of a camera optics system. In particular, Adjustable Element Cavity 5A is wider or shaped differently than a Clamping Surface 5B of the Lower Clamp 5 which permits the SUT's 4 Adjustable Element 4A to move without being clamped or immobilized along a body portion 4B of the SUT 4. The Adjustable Element Cavity 5A can be defined by edges of a Lower Clamp 5 Clamping Surfaces 5B. The Adjustable Element Cavity 5A can also permit clamping of the SUT 4 to avoid damaging adjustable elements of the SUT 4. An exemplary embodiment of an Upper Clamp 6 (not shown, but, e.g., see FIG. 1) can be shaped with a symmetrically shaped (e.g., shape mirroring or shaped similarly or with a same shape as the Lower Clamp 5) Adjustable Element Receiving Cavity 5A and Clamping Surfaces 5B as shown in e.g., FIG. 1B in order to facilitate movement/damage avoidance by an exemplary Upper Clamp 6. FIG. 1C shows a perspective view of the FIG. 1B exemplary Lower Clamp 5 holding an exemplary SUT 4 such as, e.g., shown in FIG. 1A, showing how an Adjustable Element 4A of SUT 4 can be positioned within Adjustable Element Receiving Cavity 5A with respect to Clamping Surfaces 5B.

FIG. 1A also shows an exemplary SUT 4 (e.g. a camera with optics such as the camera optics system) and a reference optics used with an exemplary embodiment of the invention. For example, another alternative embodiment can include placing two separate SUTs on the Vibration Table 1. For example, a SUT 4 with the reference system comprising, e.g., a Glass Lens 271, as well as a SUT 4' having, e.g., a Liquid Lens 273 as well as cameras on both SUTs 4, 4' can be simultaneously tested. A single ITS 55 can be used as well as multiple or separate ITS 55 can be used with TCS 15, EOCC 51, and Vibrational Loading System (VLS) 53. Embodiments of the VLS can include a vibration isolation structure adapted to permit lateral movement and attenuate or reduce off-lateral axis movement and/or vibration transmitted from the VLS to a support structure underneath the VLS. The exemplary vibration isolation system or structure can include an air bearing or air cushion generating structure and interface with the support structure which permits lateral movement, reduces off-lateral axis movement, and damps or significantly isolates vibration transmitted to the support structure (e.g., reduction by ninety nine percent).

Referring to FIG. 2, an exemplary TCS 15, EOCC (not shown here but, e.g., see FIGS. 2A and 2B, 51), Oscilloscope 16, Function Generator 17, DC Power Supply 19, and (VLS 53 (e.g., see FIGS. 2A and 2B, which includes Vibrational Table 1, shown) can be synchronized with ITS 55. System elements coupling with and measuring data associated with the exemplary SUT 4, e.g., as described in FIG. 1/1A-1B (e.g., elements 1-9, 1A/1B, and 40) and can be connected to TCS 15 via a BNC cable from one or more accelerometer amplifiers (not shown but, see e.g., FIGS. 2A and 2B, 53A) to an input jack 11 (rear of TCS 15 as shown). Exemplary TCS 15 can be powered by 5 volts direct current (DC) via a DC Power Supply 20 and BNC cable 18 into a TCS 15 input jack 12. An oscilloscope 16 can be used to verify an accelerometer's waveform (e.g., accelerometer 53A, for debugging purposes and determining amplitude of e.g., accelerometer signal output(s) (e.g., 60)(see, e.g., FIG. 7) to design elements of embodiments of the invention). Oscilloscope 16 can also have a Function Generator 17 that can artificially stimulate an exemplary system to verify operation. TCS 15 is connected to EOCC (not shown here but see FIGS. 2A and 2B, 51) via a shielded input output cable 14. Exemplary ITS 55 can be powered by 5 V DC power supply via cable 19 and triggered by exemplary TCS 15 via a BNC cable 21 and into Input Jack 13. Exemplary ITS 55 can be mechanically mounted using Opto-Mechanical Equipment 22.

Figure 2A:
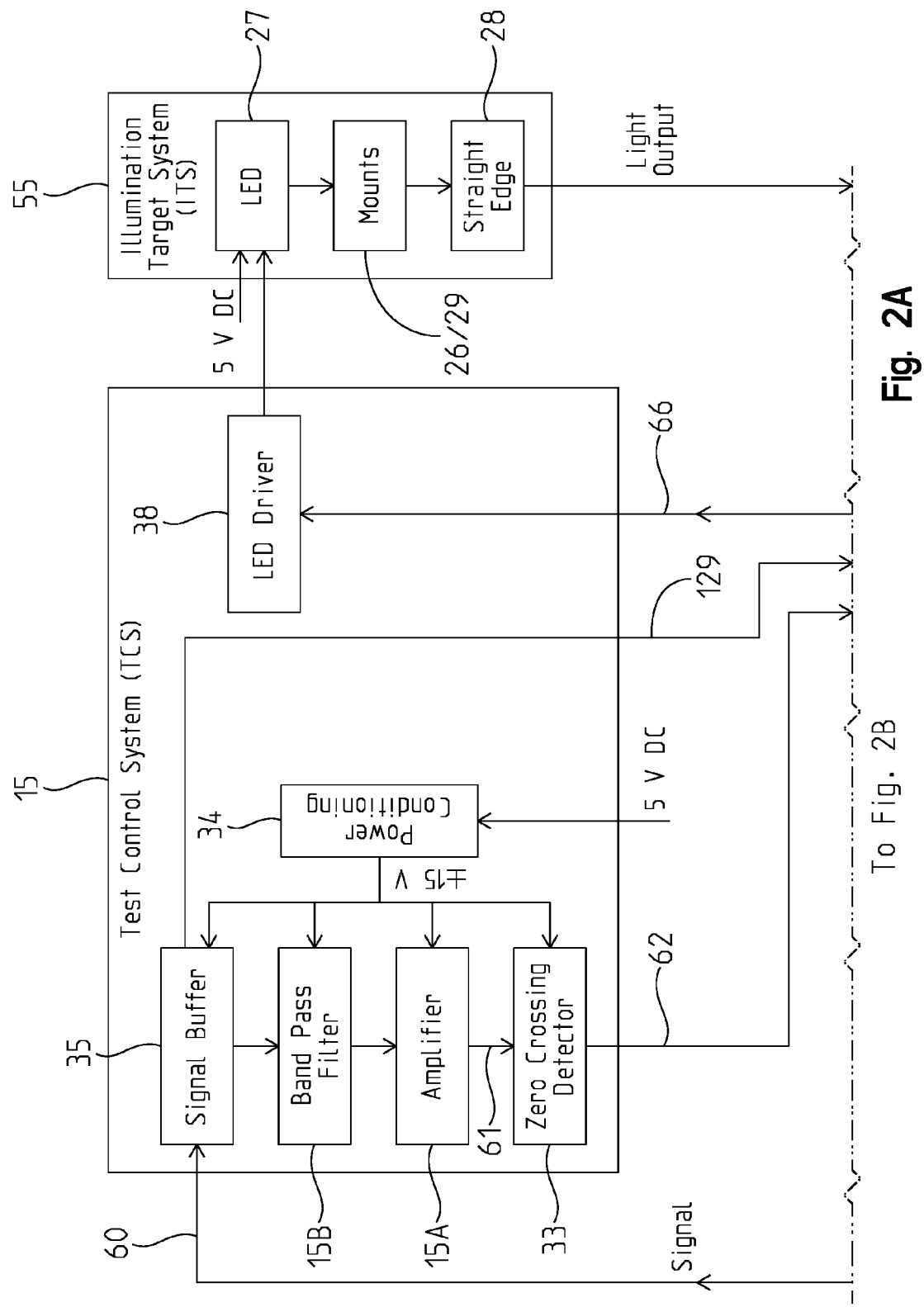
FIGS. 2A and 2B show an exemplary simplified system functional block diagram with some interrelationships such as signal/data paths and some mechanical relationships.
Figure 2B:
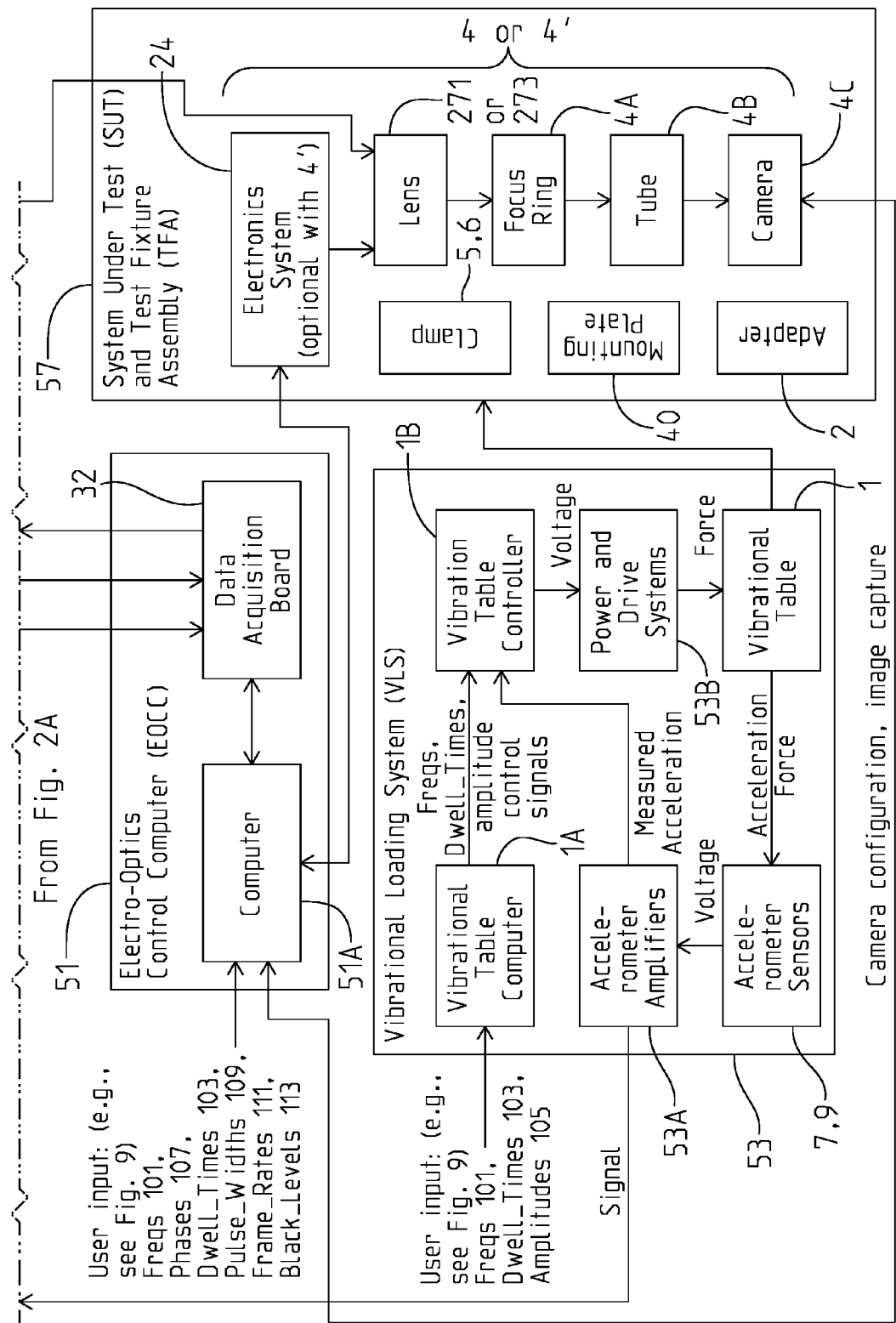

FIGS. 2A and 2B show a simplified system functional block diagram with some interrelationships such as signal/data paths and some mechanical relationships e.g., application of force by Vibrational Table 1 in accordance with an exemplary embodiment of the invention. In particular, FIGS. 2A and 2B show a TCS 15, EOCC 51, VLS 53, ITS 55, and SUT/test fixture assembly 57 in accordance with one embodiment of the invention. A TCS 15 includes a Power Conditioning System 34 that couples with a Signal Buffer 35 (which receives an Actual Accelerometer Voltage Signal 60 (e.g., see FIG. 7) from Accelerometer Amplifiers 53A), an Amplifier (e.g., 100x amplifier) 15A, a Zero Crossing Detector 33 (which receives a Processed/Amplified Accelerometer Voltage Signal 61 from Amplifier 15A and outputs Zero Crossing Detector 33 Output 62 to Data Acquisition Board 32 (e.g., see FIG. 7)), and a Band Pass Filter 15B. In this embodiment, the Zero Crossing Detector 33 receives output from Amplifier 15A (powered by output from power conditioner 34) and outputs a high digital signal to a Data Acquisition Board 32 when an amplified signal that has been generated by an Accelerometer Amplifier 53A and processed through Signal Buffer 35, Band Pass Filter 15B, and Amplifier 15A at a point when Zero Crossing Detector 33 input voltage crosses from positive to negative. Zero Crossing Detector 33 digital output signal returns to a low signal when its input voltage crosses from negative to positive value(s). This high and low digital signal output to the Data Acquisition Board 32 can also be detected based on setting a voltage threshold that is can be used to identify the high and low digital signal. Zero Crossing Detector 33 output can be used by an EOCC 51 (received through Data Acquisition Board 32) to control a LED driver 38 via either control logic or software control instructions. In other words, Zero Crossing Detector 33 can be used in conjunction with other elements of the invention (e.g., software using the Zero Crossing Detector 33 output to determine a trigger point for LED 27 in ITS 55 based on e.g., a predetermined delay from a Zero Crossing Detector 33 related to phase of VLS 53 movement) for operating LED driver 38 which in turn pulses LED 27 in ITS 55. Put another way, Zero Crossing Detector 33 can be used with elements of the invention to synchronize operation of LED 27 in ITS 55 with movement of a VLS 53. A Signal Buffer 35 has an output to a Data Acquisition Board 32 in EOCC 51 system and a Band Pass Filter 15B. Band Pass Filter 15B couples with an Amplifier 15A which in turn couples with a Data Acquisition Board 32 in an EOCC 51. LED Driver 38 receives output from a Data Acquisition Board 32 and generates an output signal to an LED 27 in ITS 55. EOCC 51 also includes a computer system 51A that receives inputs from a SUT 4 within the SUT and test fixture assembly 57 along with other inputs (e.g., exemplary user inputs are described in FIG. 9). Computer 51A has control systems, e.g. software, that controls some processing through settings or configurations to include a user selected or configured Software Trigger Point Setting—e.g., When Zero Crossing Detector Output 62 Goes High 63 (e.g. rising, falling trigger) (e.g., see FIG. 7) for synchronization with Accelerometer 7 or 9 used in part to control LED driver 38 operation. Software/computer 51A generates a LED Pulse Control Voltage Signal at a Phase Delay 66 that is input into LED Driver 38 to operate LED 27 in ITS 55. Computer system 51A receives user input described in FIG. 9 (e.g. Freqs 101, Phases 107, Dwell_Times 103, Pulse_Widths 109, Frame_Rates 111, Black_Levels 113). VLS 53 includes a Vibration Table Computer 1A which receives user inputs via an input/output system (e.g., keyboard/software/display) which receives frequency, dwell time, and amplitude inputs for the vibration system. Vibration Table Controller 1B receives frequency, dwell time, and amplitude control signals which in turn output voltage control signals into Power and Drive Systems 53B which apply force to a Vibrational Table 1. Vibrational Table 1 applies force (acceleration for example) to SUT 4 and Test Fixture 57 (e.g., see FIG. 1) which is also measured by Accelerometers 7, 9 coupled with Vibrational Table 1 for operation as discussed, e.g., above and below. Accelerometers 7, 9 output signals to Accelerometer Amplifiers 53A which output signals to Signal Buffer 35 for processing as discussed above and separately to Vibration Table Controller 1B for feedback control of Vibration Table 1. ITS 55 includes LED 27, Mounts 26/29, and Straight Edge structure 28 (e.g., razor blade). LED Driver 38 output along with voltage e.g., 5 VDC is input into LED 27 which generates light output that is partially masked by the Straight Edge 28 to create a sharply defined edge (i.e. half moon target) to the light output that is received into a Lens (e.g. Reference Glass Lens 271 or Liquid Lens 273) of SUT 4 structure. Sharp edged light output measured by Camera 4C can be stored as a data image and then sent to Computer 51A where data image file can be processed by a MTF in the EOCC 51A (and/or post processing that can be done in Computer 51A or in another system). MTF characterizes resolution of an optical imaging system such as the lens and the camera or SUT 4. Such characterization can include contrast versus cycles per milliradian or spatial frequency, etc. which is then used to determine optical element's resolution at each vibration table frequency. Such information can be used to evaluate an optical element's response to various vibrational loading profiles or conditions. For example, if an optical system is desired to be mounted on a vehicle then estimated vibrational loading of a vehicle can be loaded via Vibrational Table 1 to test an optical element or system's performance under such loading. Such performance can include evaluation of clarity or usability of images collected by an optical element or system. For example, blurry images are not usable if such blur results in inability to recognize or identify elements or aspects of subjects that are being photo-imaged by the optical element such as faces, vehicle identification cues (license plate), gun versus tool, airplane versus bird, etc. SUT 4 and Test Fixture Assembly 57 has a Mounting Plate 40 and Clamps 5, 6 which hold the Camera 4C, Tube 4B, and Lens Assembly 4 or 4' (if including Electronics System 24) in relation to VLS 53.

Figure 2C:
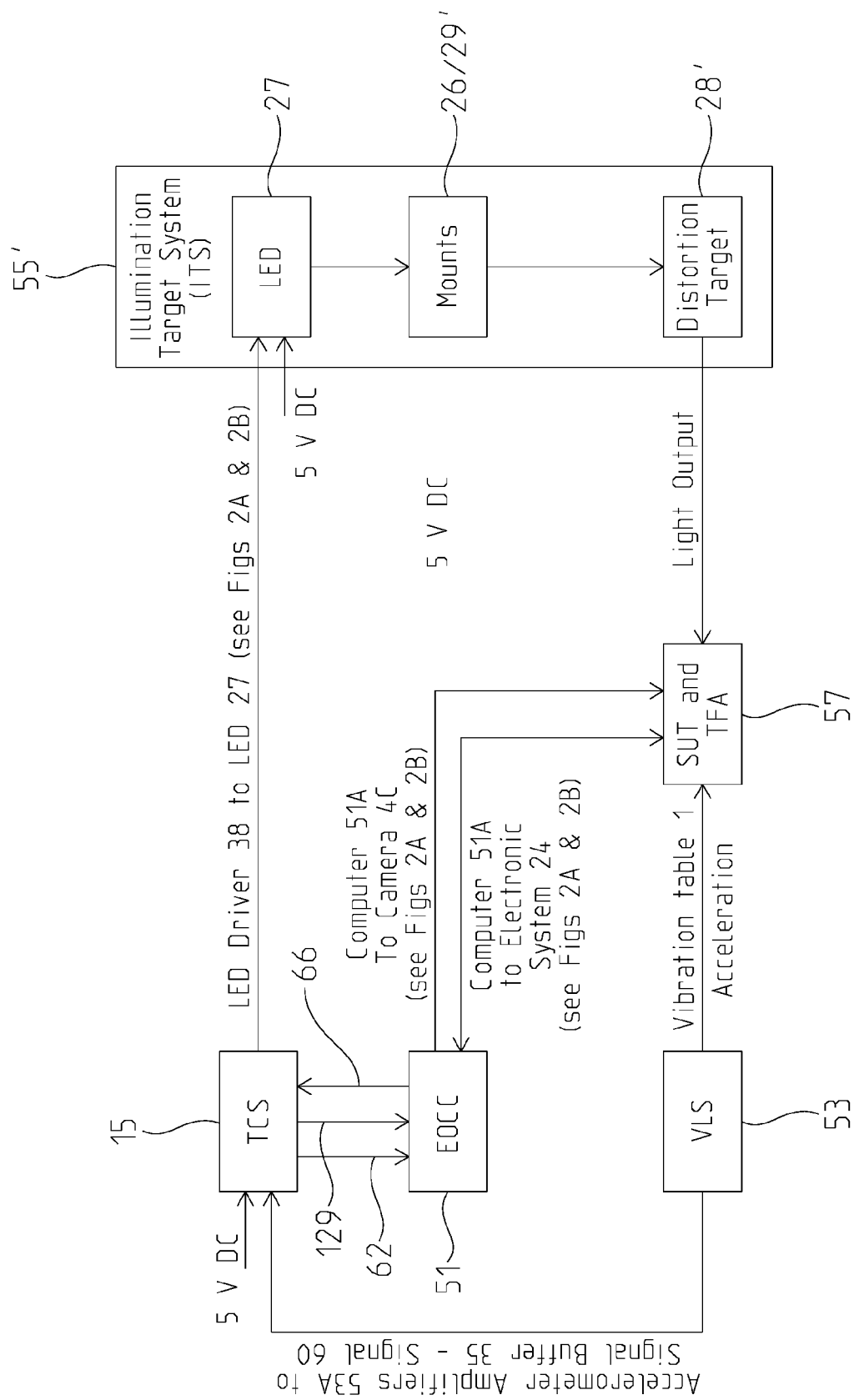
FIG. 2C shows an exemplary simplified system functional block diagram with some interrelationships such as signal/data paths and some mechanical relationships for an alternative embodiment of the invention.

FIG. 2C shows an alternative embodiment of a simplified system functional block diagram with some interrelationships with some elements as described in FIGS. 2A and 2B and additional elements associated with distortion mapping post-processing. As shown in FIG. 2C, an alternative embodiment of an ITS 55' can includes LED 27, Mounts 26/29', and Distortion Target 28' (e.g., transparent glass with fixed spacing grid or pattern of light absorbing or opaque structures, e.g., dots). LED Driver 38 output along with voltage e.g., 5 VDC, is input into LED 27 which generates light output that is partially masked by the Distortion Target 28' to create a grid pattern (e.g. fixed or multi-spatial frequency grid distortion target) to light output 36 received into a Lens e.g. not shown but see FIGS. 2A and 2B. Reference Glass Lens 271 or Liquid Lens 273) of SUT 4 structure. Patterned light output 36 measured by Camera 4C can be stored as a data image (e.g. Test Image 169) and then sent to Computer 51A where Test Image 169 can be processed to form a Distortion Mapping Result (DMR) 700 (e.g. see FIG. 11A). A DMR 700 can be formed by a distortion calculation measuring a percentage displacement of "should-be" or predicted distance of undistorted Distortion Target 28' grid pattern e.g. by measurement or knowledge of dimensions of Distortion Target 28') and an actual distance as represented in Test Image 169 as a function of position in a Test linage 169. In other words, distortion calculation measures a percentage of warping a SLIT 4 causes in an image which may degrade performance in an end application. For example, distorted images are not usable if such distortion results in inability to recognize or identify elements or aspects of subjects that are being photo-imaged by the optical element such as faces, vehicle identification cues (license plate), gun versus tool, airplane versus bird, etc. However, such distortion, if quantified, may be corrected in imaging software before it is displayed to the user in an end application.

Figure 3:
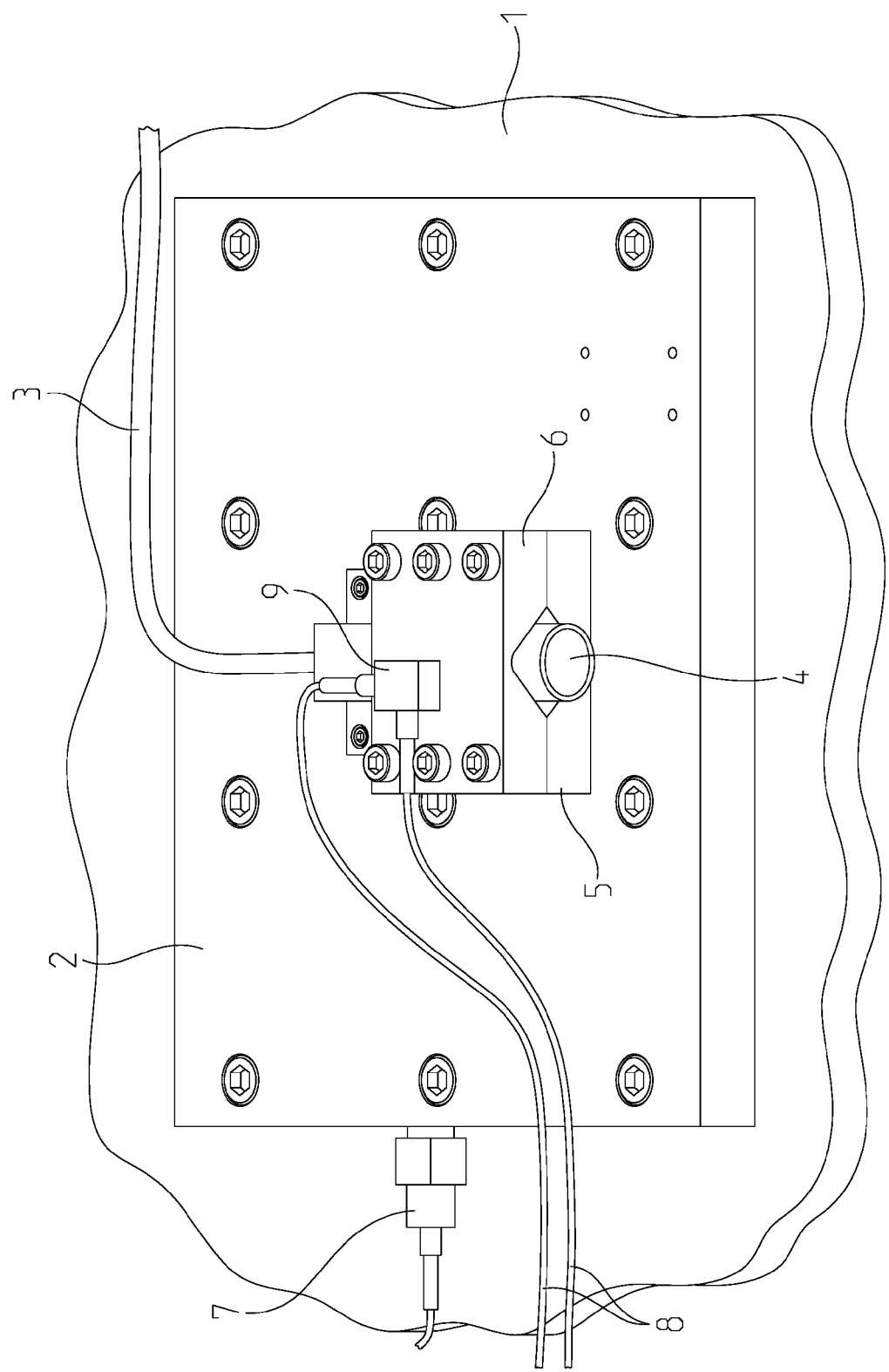
FIG. 3 shows a perspective view of an optical element and imaging SUT mounted onto a VLS in accordance with an exemplary embodiment of the invention.

Referring to FIG. 3, Vibrational Table 1, Adapter Plate 2 which receives an exemplary SUT 4 (e.g., camera, tube, and lens) clamped via Mounting Plate 40 (not visible), a Lower Clamp 5, and an Upper Clamp 6 is shown. SUT 4 (e.g., camera with optics) can be connected to exemplary EOCC 51 via a USB 3.0 cable 3. Accelerometer Sensor 7 can be used for Vibration Table 1 control where another Accelerometer Sensor 9 can be used for data collection and ITS 55 synchronization; both accelerometers can be connected via Accelerometer Cabling 8 to Accelerometer Amplifiers 53A (not shown, but e.g., see FIGS. 2A and 2B).

Figure 4:
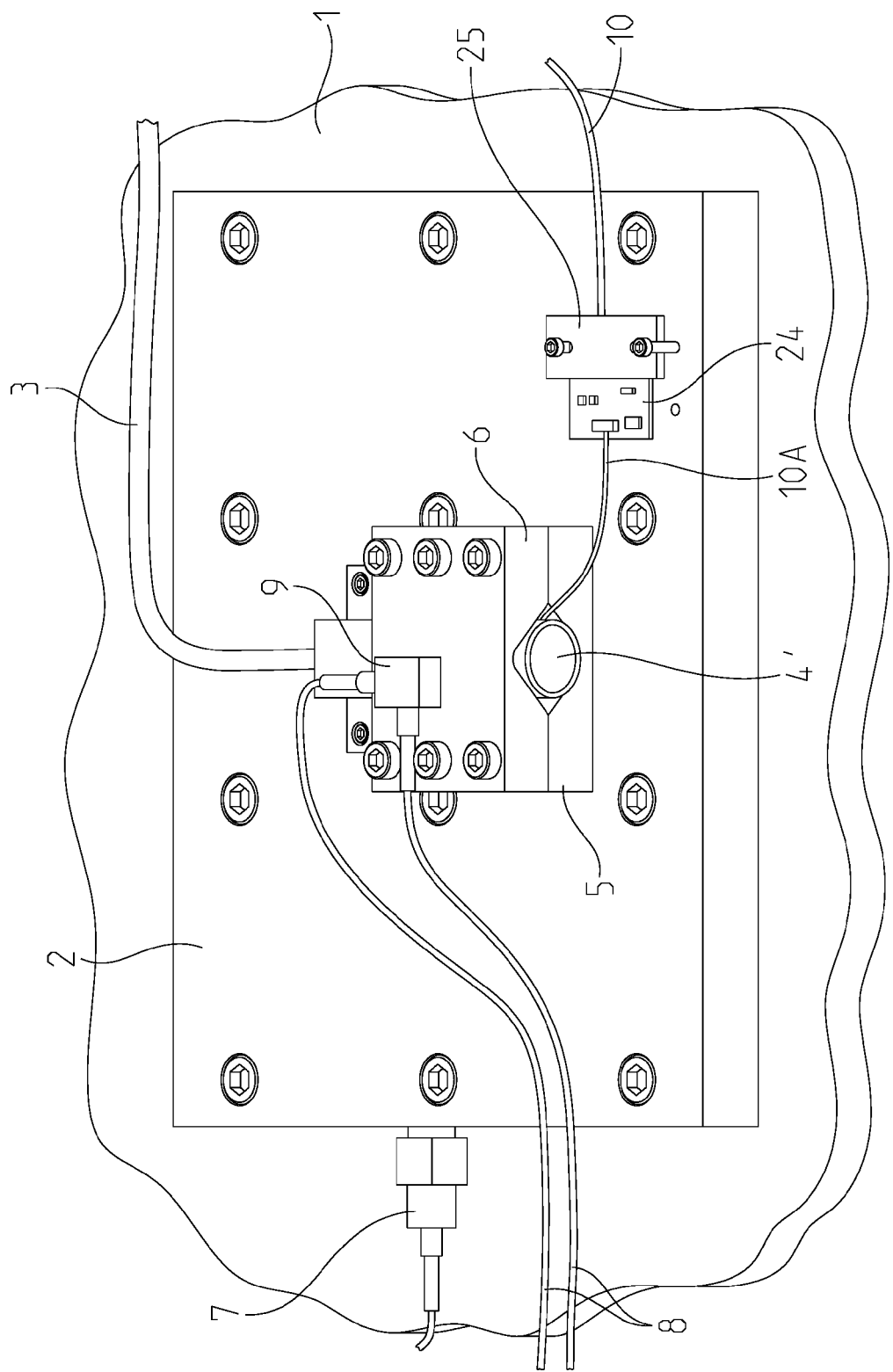
FIG. 4 shows a perspective view of an electronically controlled optical device (e.g. a liquid lens) and imaging SUT mounted onto a VLS in accordance with an exemplary embodiment of the invention.

Referring to FIG. 4, an Electronically Controlled SUT (e.g. optical device and camera system with an electronically adjustable focus system) 4' can be provided for as it is possible that some optical elements can be electronically controlled, and would require an Electronics System 24, clamped to an Adapter Plate 2 via a Clamp 25, and connected to both an Electronically Controlled SUT 4' electronically adjustable element under test (via Cable 10A) and an EOCC 51 via a USB 2.0 cable 10.

Figure 5:
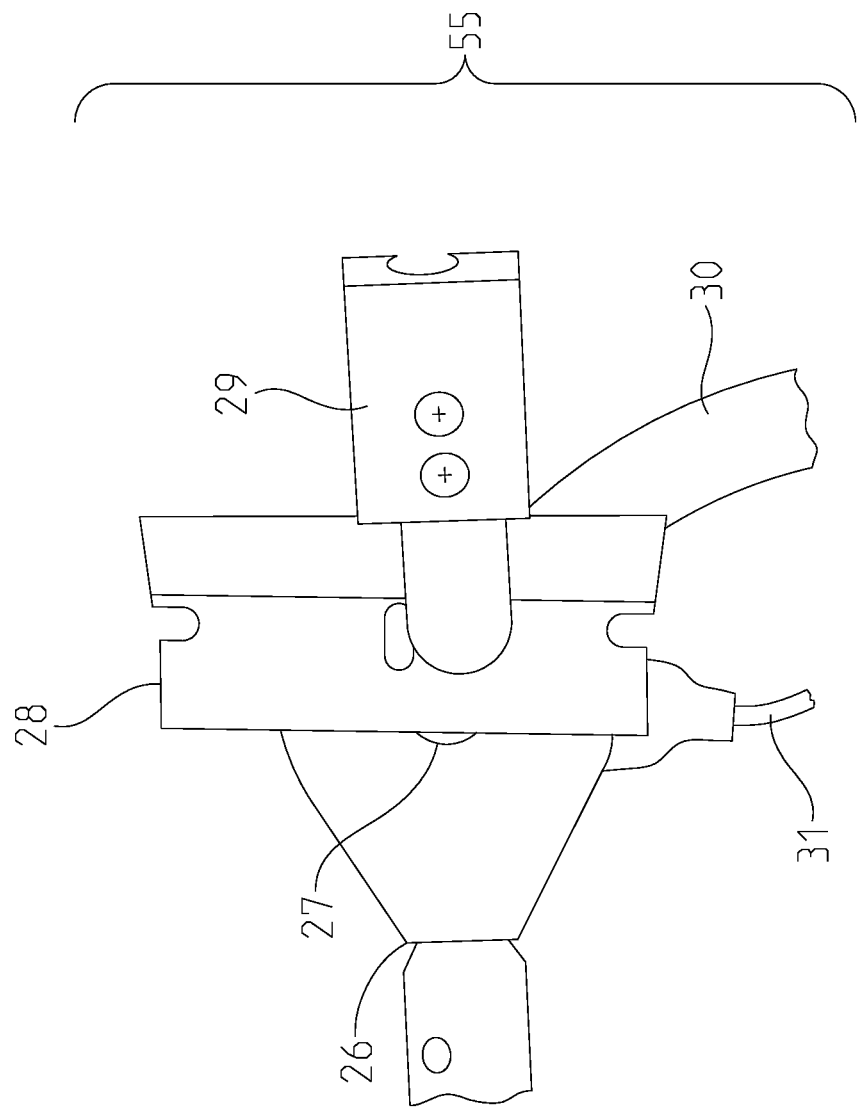
FIG. 5 shows an end view of an exemplary light emitting diode ITS used to measure optical characteristics of an optical device under test in accordance with an exemplary embodiment of the invention.

Referring to FIG. 5, an exemplary ITS 55, with LED 27 that is half covered using a precision Straight Edge (e.g. a razor blade) 28 to generate a half-moon target (i.e. a target with extreme contrast change with a very precise edge used in optical MTF characterizations). Exemplary LED 27 can be mounted via Opto-mechanical Hardware 26, and a precision Straight Edge 28 with Hardware 29. Anode terminal connection (not visible) and cathode terminal connection (not visible) of an LED 27 are connected via Cables 30 and 31, respectively.

Figure 5A:
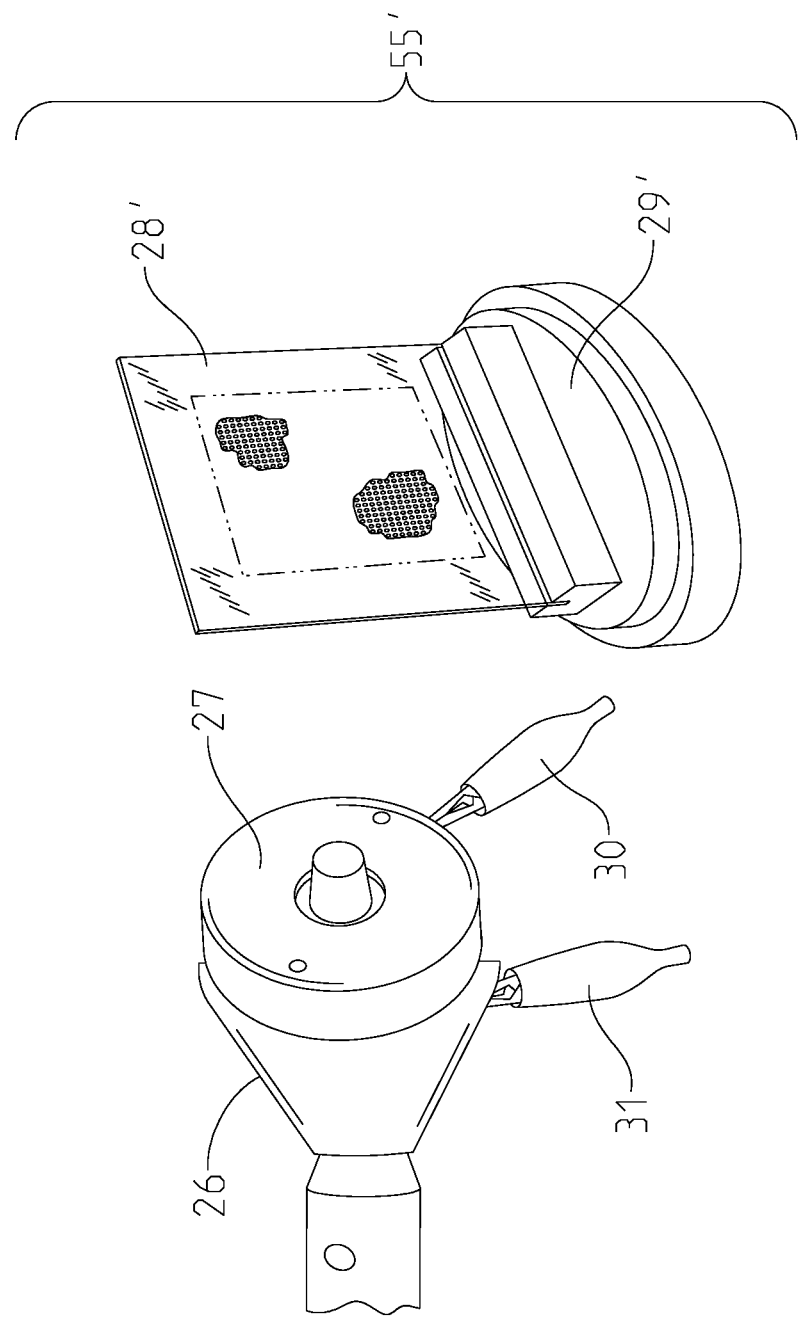
FIG. 5A shows an exemplary perspective view of an exemplary light emitting diode ITS used to measure optical characteristics of an optical device under test used with distortion mapping post processing analysis in accordance with another exemplary embodiment of the invention.

Referring to FIG. 5A, an exemplary ITS 55', with LED 27 that passed light through a Distortion Target 28' (e.g. a transparent glass with fixed spacing light absorbing, blocking or opaque structures in a grid pattern (e.g. dots), Exemplary LED 27 can be mounted via Opto-mechanical Hardware 26, and a precision Distortion Target 28' with Hardware 29'. Anode terminal connection (not visible) and cathode terminal connection (not visible) of an LED 27 are connected via Cables 30 and 31, respectively.

Figure 6:
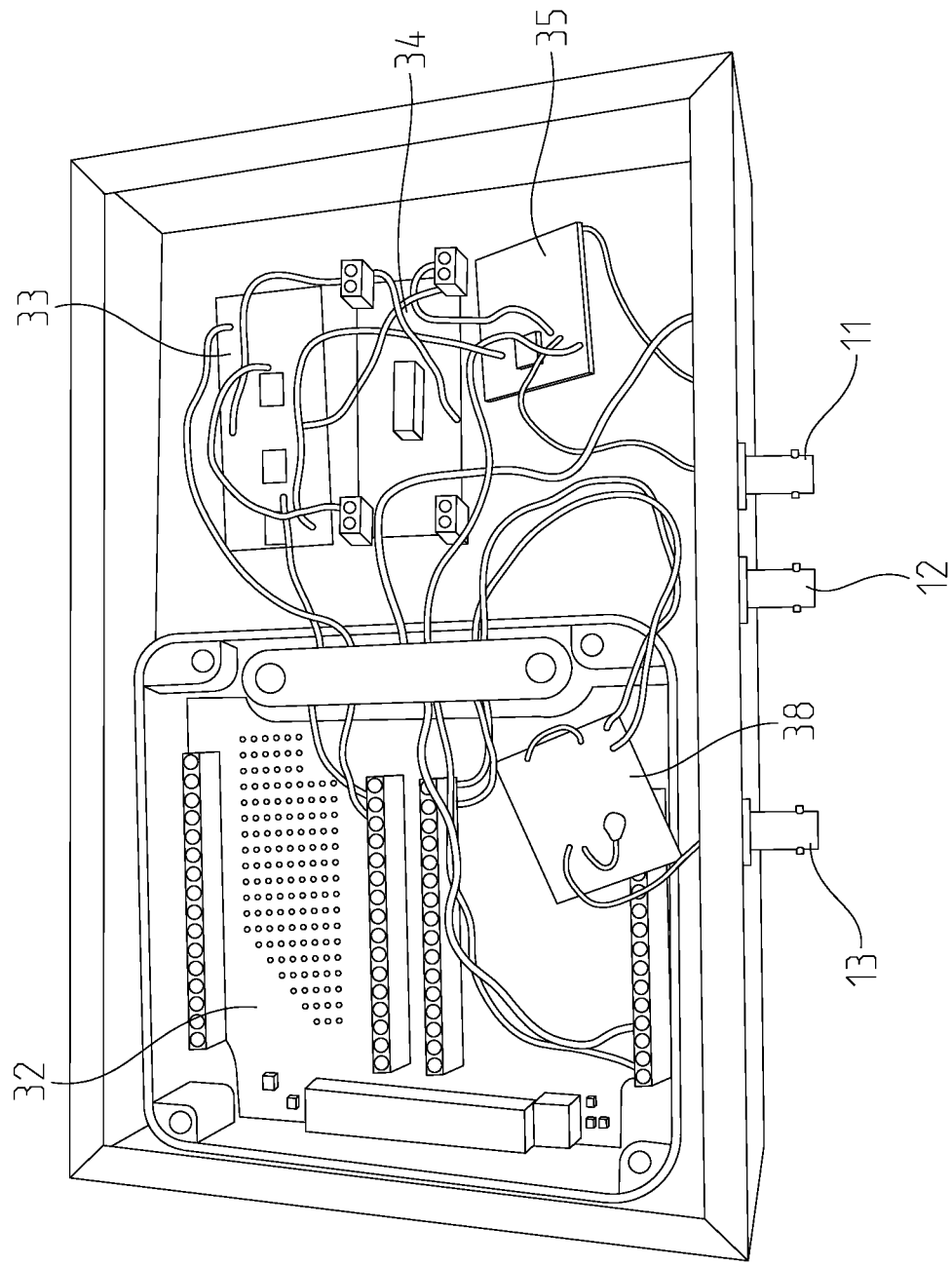
FIG. 6 shows a top view of an embodiment of electronic circuitry used for an ITS and synchronization with a vibrational table in accordance with an exemplary embodiment of the invention.

Referring to FIG. 6, a perspective view of exemplary TCS 15, e.g., as described in FIGS. 2A and 2B, with a Data Acquisition Board 32, custom electronic systems including a Buffer Board 35, Power Conditioning Board 34, Amplifier 15A and Zero Crossing Detector 33, and LED driver 38 are used to control ITS 55 (not shown; however, e.g., see FIGS. 2A and 2B). Exemplary TCS 15 can be powered via DC Power Supply (e.g., 5V DC) and BNC Input Jack 12. Accelerometer signal(s) from an Accelerometer Amplifier 53A (e.g., see FIGS. 2A and 2B) can be connected to Input Jack 11. ITS 55 Cathode Cable 31 (FIG. 5) can be connected to Output Jack 13.

Figure 7:
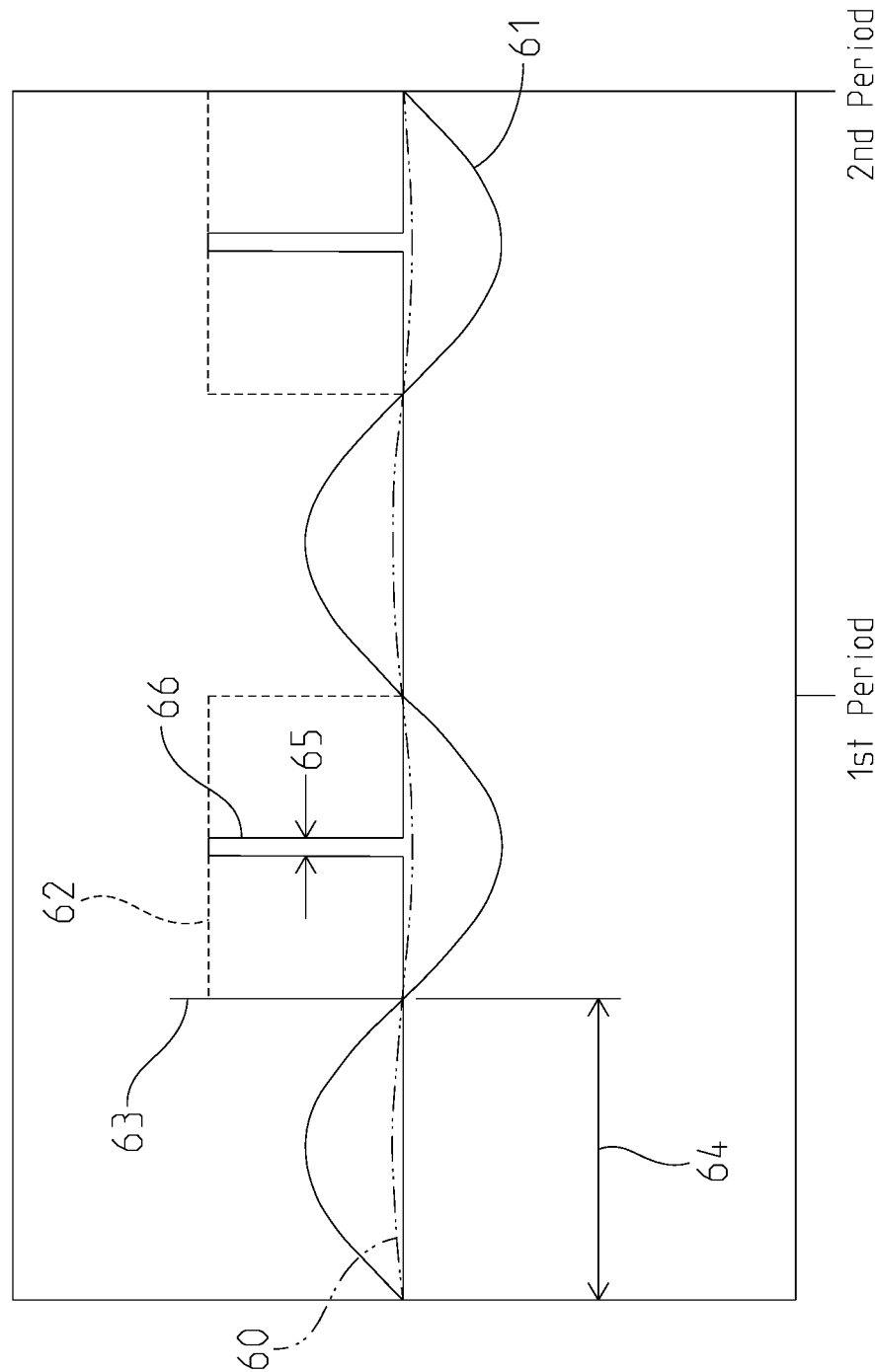
FIG. 7 shows relationships between waveforms and timing of a variety of signals (e.g., input signals and output signals)

Referring to FIG. 7, exemplary relationships between waveforms and timing of a variety of signals (e.g., input signals and output signals) are shown in accordance with one embodiment of the invention. Input signals can include an Actual Accelerometer Voltage Signal 60 from Accelerometer Amplifier 53A which represents signal processed output from Accelerometers 7 or 9 that is processed by Signal Buffer 35, Band Pass Filter 15B, and Amplifier 15A then input into a Zero Crossing Detector 33 (see FIGS. 2A and 2B, TCS 15). Processed/Amplified Accelerometer Voltage Signal 61 is output from Amplifier 15A and input into Zero Crossing Detector 33 (also see FIGS. 2A and 2B, TCS 15). Zero Crossing Detector 33 output 62, Software (in 51A) Trigger Point Setting (e.g., when Zero Crossing Detector output 62 goes high) 63, Commanded Phase Delay (user input phases 107, see FIG. 9) 64, Commanded Pulse Width (user input Pulse_Widths 109, see FIG. 9) 65, and LED Pulse Control Voltage Signal (e.g., at commanded Phases 107/Pulse_Widths 109) 66 are shown. One important aspect of some embodiments are shown in FIG. 7 in how an embodiment of the system senses a preset trigger point (e.g., 63) based on accelerometer signals 60, 61, 62 used to initiate triggering ITS 55 operation with user selected Pulse_Widths 109 after user input Phases 107 (e.g. Phases 107 related to time delay of pulses). In this case, an exemplary phase delay is from phase zero to phase approximately 270 degrees in a first period shown in FIG. 7. A second period of the waveform and timing of signals that are identical to a first period is also shown FIG. 7. Another important aspect shown in FIG. 7 is how an embodiment of the system controls motion recorded by SUT 4 independent of a Camera 4C exposure time by Commanded Pulse Width 65 (user input Pulse_Widths, 109, see FIG. 9). In other words, in an embodiment of the invention Test Image 169 only captures light generated by ITS 55 during a Commanded Pulse Width 65, which moves as a function of VLS 53 Freqs 101 and Amplitudes 105. For example, a Commanded Pulse Width 65 (e.g., proportional to, e.g., a velocity of motion times Pulse Width 65 (e.g. 100 nanoseconds)) can select or limit a degree of motion (or blur) that can be present or captured in a Test Image 169. For example, a short (e.g., 100 ns) vs long (e.g., 10 µs) Commanded Pulse Width 65 can have one hundred times more or less motion or blur in an exemplary Test Image 169. Accordingly, a SUT that includes a camera and OE can be characterized based on specified motion or jitter that is allowable by a certain application or need, and enables isolation of sources of image degradation based either on motion during an image capture event or from structural bending or deformation of optical elements.

Figure 8A:
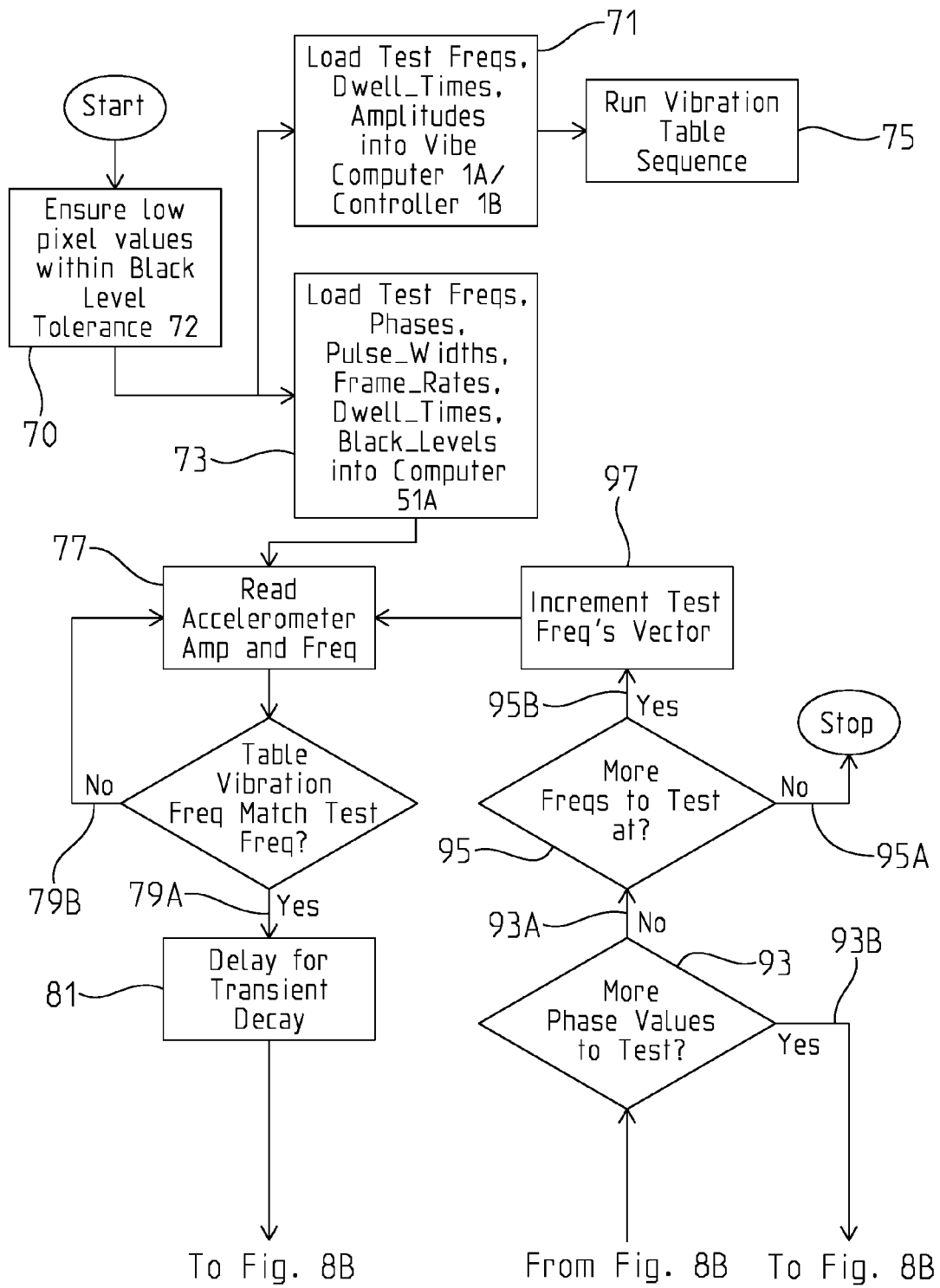
FIGS. 8A and 8B show an exemplary simplified method of operation of a system in accordance with one embodiment of the invention.
Figure 8B:
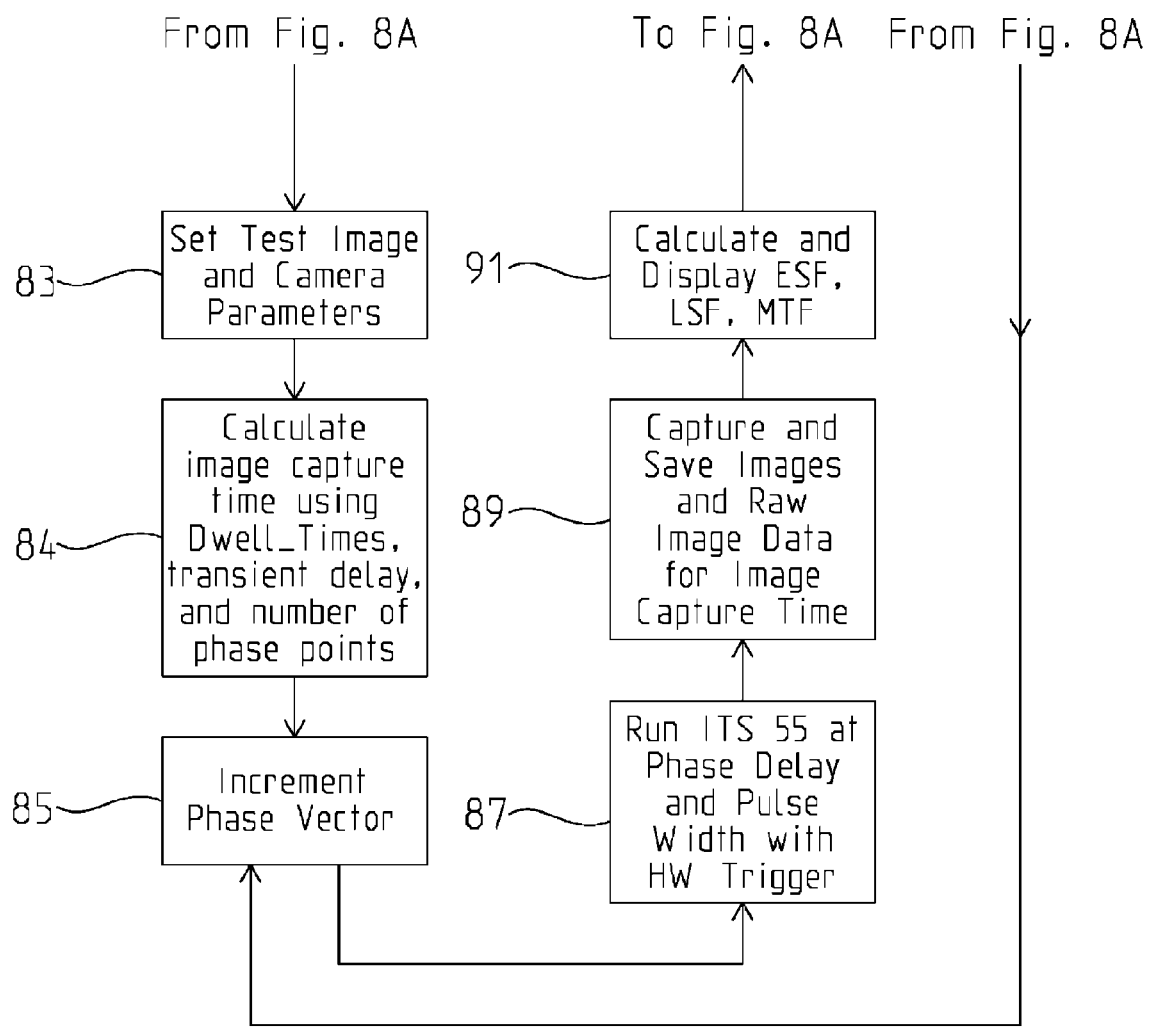

FIGS. 8A and 8B show an exemplary simplified method of operation of a system in accordance with one embodiment of the invention. Processing is started and Step 70 includes ensuring low pixel values in Pixel Values over ROI 232 (e.g. see FIG. 12) within Black Level Tolerance 72 by either reducing ambient light incident on ITS 55 if needed (e.g. turn off room lights directly over ITS 55) or increasing user input Black_Levels 113. Black level can be defined as a level of brightness at a darkest (black) part of a visual image. User input Black_Level can allow for adjustment of a level of brightness at the darkest part of a Test Image 169 to ensure no dark information is lost or clipped in resulting sampling or measurements. Black Level Tolerance 72 can be a window of values that is approximately 20%+/−10% of a maximum value that Pixel Values of ROI can assume. User inputs are made at Steps 71 and 73. Step 71 includes loading VLS 53 test variables using, e.g., a GUI or a data input: e.g., Freqs 101, Dwell_Times 103, Amplitudes 105 into Vibration Computer 1A/Controller 1B. Step 73 includes loading EOCC 51 test variables: e.g., Freqs 101, phases 107, Pulse_Widths 109, Frame_Rates 111, Dwell_Times 103, and Black_Levels 113 into software or control sections of Computer 51A (e.g., a GUI). At Step 75, run VLS 53 sequence in accordance with control software, programmed control sequences, and configuration settings in VLS 53 based on Step 71 user input data. For example, a programmed control sequences can include control instructions to operate VLS 53 so it ramps up Vibration Table 1 to a predetermined acceleration amplitude and frequency and then wait at that amplitude for an appropriate dwell time using Accelerometer 7 or 9 for feedback control; then decelerate down to rest; then increments to next values in vibration system user input lists, e.g., vector inputs (e.g., Freqs 101, Amplitudes 105, etc.) and repeats at least some of programmed control sequences based on a set of incremented values (or performs a different programmed sequence at this point). At Step 77, Read Accelerometer Amplitude and Frequency. At Step 79B, determine if VLS 53 frequency read at Step 77 matches test frequency? If yes, at Step 79A, execute Step 81 Delay for Transient Decay (this can be an additional user input (not shown present) or a fixed value in software or a control system for VLS 53); if no, then at Step 79B, return to Step 77 and recommence processing at Step 77. At Step 83, set ITS 55 and SUT Camera 4C parameters (see e.g. FIG. 9). At Step 84, calculate image capture time for controlling the SUT Camera 4C using dwell time, delay for transient decay time, and number of phase values in user input phase data 107. Next, at Step 85, increment to next value in phase vector (e.g. a list—0, 90, 180, 270 etc degrees) (e.g., phase vector list comes from, e.g., user input phase 107). At Step 87, run LED 27 to generate strobed ITS 55 at user input phase delay value with hardware (HW) trigger (e.g., Zero Crossing Detector 33 with software defined delay and pulse width control). At Step 89, capture and save images and raw image data (also can be video) received through SUT 4 optical element and captured by camera (in this example part of SUT 4, e.g., 4C) for a duration of time equal to image capture time. At Step 91, calculate and display edge spread function (ESF), line spread function (LSF), and MTF then display to graphical user interface (e.g. see FIG. 12). At next Step 93, determine if more user input phase values (e.g., Phases 107) are to be tested; if yes, then at Step 93B, recommence Step 85 increment to next value in the phase vector list 107; if no, then at Step 93A, proceed to Step 95. At Step 95, determine if more user input frequency values (e.g., Freqs 101) are to be tested; if yes, then at Step 95B proceed to Step 97 and recommence processing at Step 97; if no, then at Step 95A proceed to stop processing, and thus testing in this exemplary embodiment has been completed. At Step 97, increment to a next value associated with the user input frequency (e.g., list of Freqs 101) vector and proceed to Step 77 and recommence processing at Step 77.

FIG. 9 shows a table of some user inputs in accordance with one embodiment of the invention. User inputs include Freqs 101 (a list or vector of commanded vibration frequencies of vibration table (a list of one or more)); Dwell_Time(s) 103 (a list or vector of time to vibrate at each Freqs (list of one or more values)); Amplitudes 105 (a list or vector of commanded acceleration amplitude for controlling the VLS 53 for each frequency (one or more Freqs 101)); Phases 107 (e.g., a list or vector of commanded phase point to start and execute the ITS 55 strobe (e.g., vibrating Table 1 at 100 Hz—where user input Phases 107 of a LED 27 strobe with respect to table acceleration can be 0, 90, 180, and 270 degrees)—Phases 107 can be one or multiple phase values); Pulse_Widths 109 (a list or vector of pulse width of ITS 55 pulse on duration (one or more)); Frame_Rates 111 (e.g. a list or vector of camera frame rate for each frequency (one or more); and Black_Levels 113 (a list or vector of camera black level adjustment for each frequency (one or more)). In various embodiments, a vector as used herein can be a numeric value list, a N-element vector, or an one dimensional matrix of numeric values.

FIG. 10 shows a table of some outputs in accordance with one embodiment of the invention. Exemplary system outputs in accordance with one embodiment of the invention can include Filename.avi 501 (e.g., video with filename with one example of attributes from a test in accordance with one embodiment of the invention e.g., "<lens>_<freq>_<phase>_<acc>_<fps>_<pw>_<bl>.avi" where <lens> 503 refers to a designator for a SUT 57 and Lens 271 or 273; <freq> 505 records an iteration value of Freqs 101; <phase> 507 records an iteration value of Phases 107); <acc> 509 records an iteration value of Amplitudes 105; <pw> 511 records an iteration value of Pulse_Widths 109; fps 513 records an iteration value of Frame_Rates 111; bl 515 records an iteration value of Black_Levels 113. LSF 517 is data to produce a Line Spread Function plot 235 on a graphical user interface (GUI) e.g. see FIG. 12; ESF 519 is data to produce an Edge Spread Function plot 233 shown in a GUI, e.g. see FIG. 12; MTF 521 is data to produce a MTF plot 237 shown on a GUI, see e.g., FIG. 12.

Figure 11:
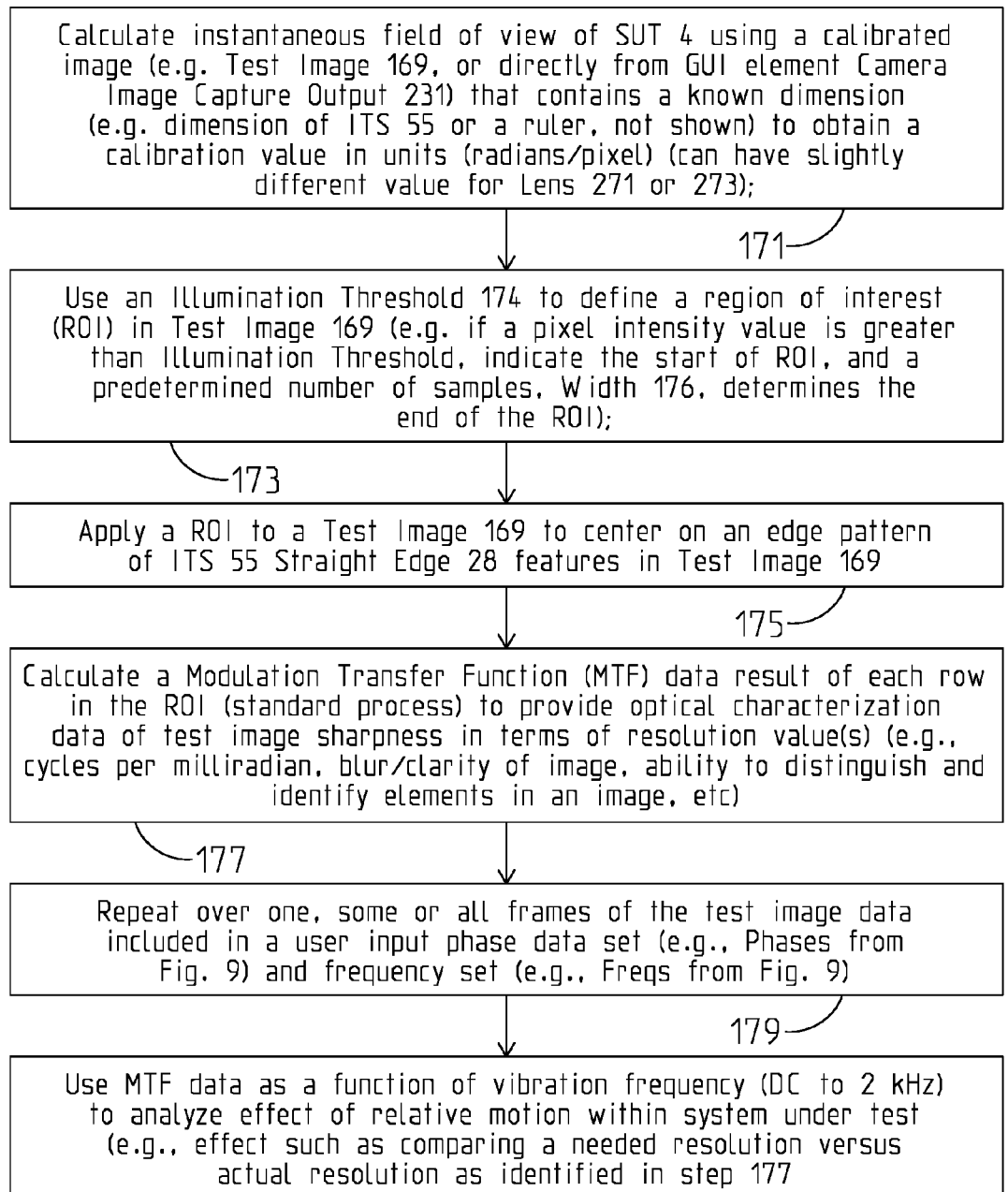
FIG. 11 shows an exemplary simplified process or method of post processing of outputs from one embodiment of the invention.

FIG. 11 shows an exemplary simplified process or method of post processing of outputs from one embodiment of the invention. Post processing can include more in-depth analysis of a Test Image 169 (e.g., still imagery or a frame of a video sequence Filename.avi 501) of ITS 55 light through SUT 4 optical element (e.g., Lens 271 or 273) mounted in TFA 57. In-depth analysis can include, for example, analyzing each row of each Test Image 169, and perform statistical and histogram analysis, including: Step 171: Calculate instantaneous field of view of SUT 4 and Camera 4C using a calibrated image (e.g. Test Image 169, or directly from GUI element Camera Image Capture Output 231) that contains a known dimension (e.g. dimension of ITS 55 or a ruler, not shown) to obtain a calibration value in units (radians/pixel) (can have slightly different value for Lens 271 or 273); Step 173: Use an Illumination Threshold 174 to define a region of interest (ROI) in Test Image 169 (e.g. if a pixel intensity value is greater than Illumination Threshold, indicate the start of ROI, and a predetermined number of samples, Width 176, determines the end of the ROI); Step 175: Apply a ROI to a Test Image 169 to center on an edge pattern of ITS 55 Straight Edge 28 (e.g., see FIGS. 2A and 2B) features in Test Image 169; Step 177: Calculate Modulation Transfer Function (MTF) data result for each row in the ROI (standard process) to provide optical characterization data of sharpness of representation of ITS 55 features captured in Test Image 169 by SUT 4 in TFT 57, in terms of resolution values (e.g., cycles per milliradian, blur/clarity of image, ability to distinguish and identify elements in an image, etc). Step 179: Repeat over one, some or all frames of SUT 4 data captured (i.e. in Filename.avi 501) included in a user input phase data set (e.g., Phases from FIG. 9) and frequency set (e.g., Freqs from FIG. 9); Step 181: Use MTF data results from Step 177 as a function of vibration frequency (e.g., DC to 2 kHz) to analyze effect of relative motion within SUT 4 (e.g., effect such as comparing a needed or predefined resolution versus actual resolution required by certain applications such as ability to distinguish objects at a certain distance or a resolution value).

Additional post processing can be performed to include distortion analysis. The term distortion can be applied interchangeably with reduced image quality. Distortion can be an individual aberration that does not technically reduce information in an image; while most aberrations actually mix information together to create image blur, distortion can simply misplace information geometrically. This means that many types of distortion can actually be calculated or mapped out of an image (e.g. see FIG. 11A), whereas information from other aberrations is essentially lost in the image and cannot easily be recreated.

Figure 11A:
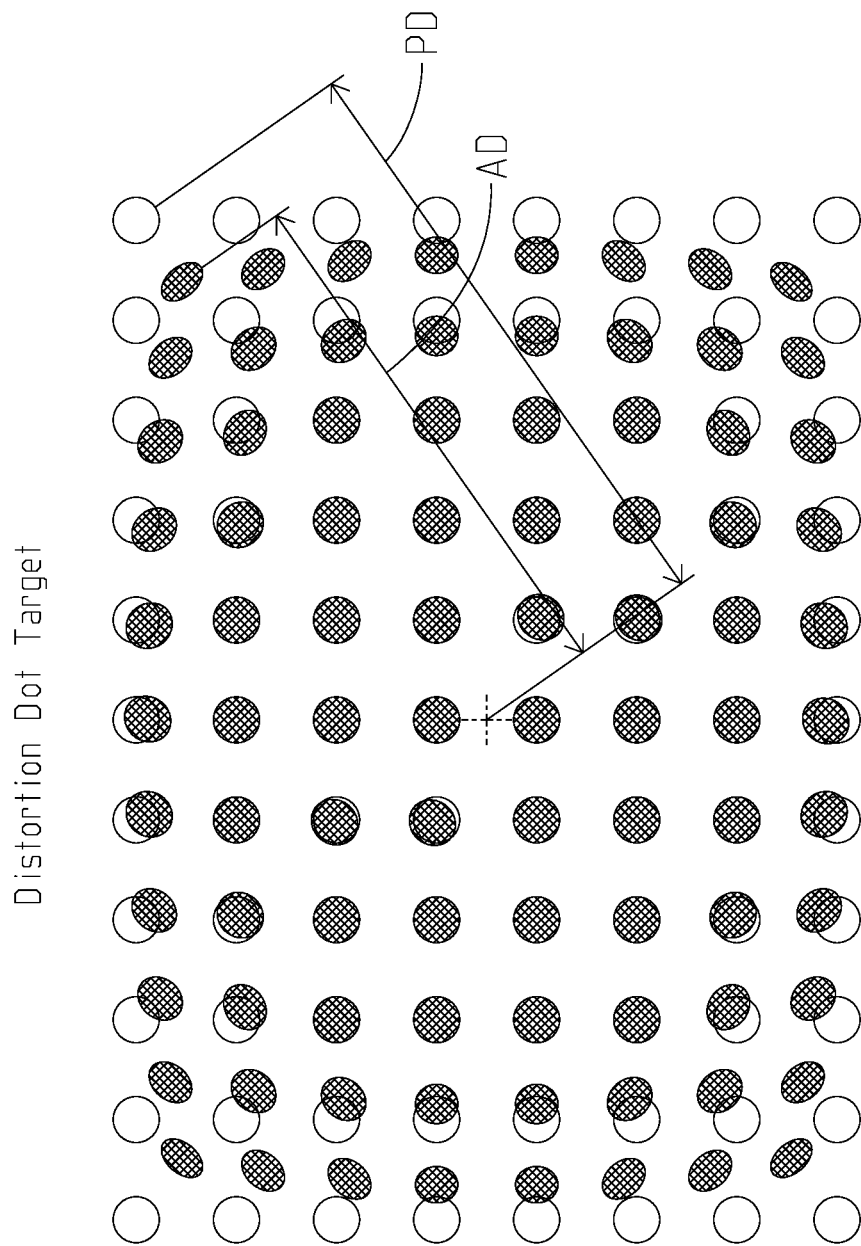
FIG. 11A shows an exemplary pattern such as a dot target pattern used to relate actual distance of pattern elements to predicted distance.

FIG. 11A shows an exemplary pattern such as a dot target pattern used to relate actual distance of pattern elements to predicted distance. In some embodiments, distortion can be calculated simply by relating Actual Distance (AD) to the Predicted Distance (PD) of a test image using Equation 1. In some embodiments, determination of AD and PD can be accomplished by using a pattern such as dot target shown in FIG. 11A.

Distortion percentage(%)=[AD−PD]/PD×100    Equation 1

Figure 11B:
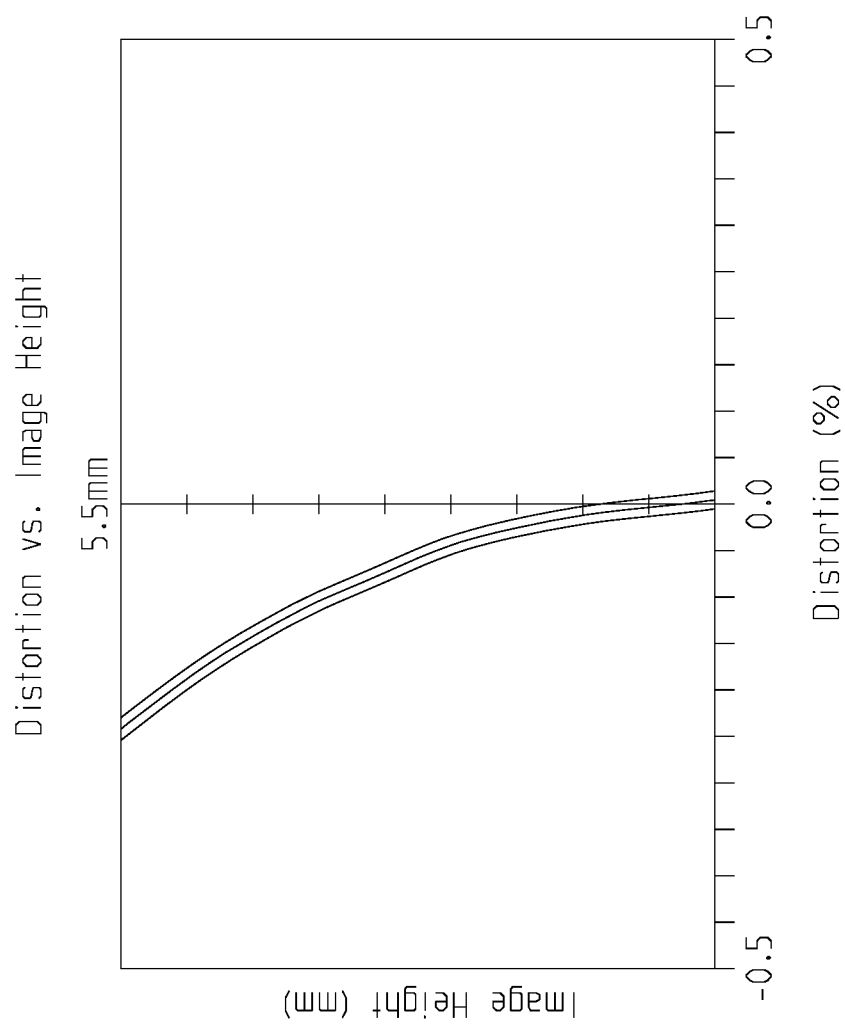
FIG. 11B shows an exemplary distortion analysis graph output showing distortion versus image height for an individual vibration frequency.

FIG. 11B shows an exemplary distortion analysis graph output showing distortion versus image height for an individual vibration frequency. Distortion can be specified as a percentage of the field height such as in FIG. 11B. In this embodiment, a FIG. 11B graph can be done for one, some, or all vibration frequencies selected for testing a SUT 4.

Figure 11C:
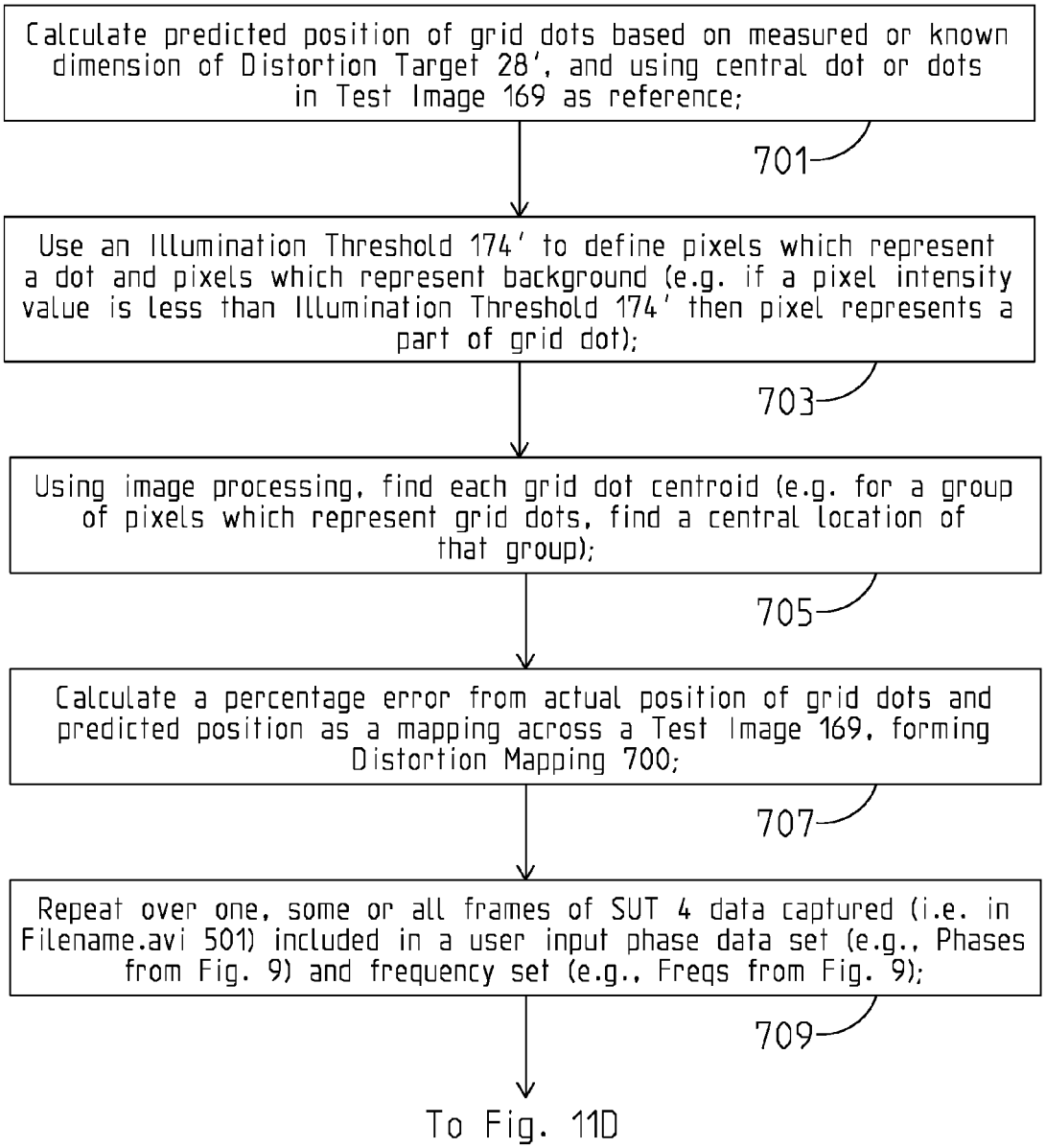

FIGS. 11C and 11D show an exemplary simplified method of post processing which can include more in-depth analysis of a Test Image 169 (e.g., still imagery or a frame of a video sequence Filename.avi 501) of ITS 55' light through SUT 4 optical element (e.g., Lens 271 or 273) mounted in TFA 57. In-depth analysis can include, for example, analyzing each position of a grid dot in an imaged pattern in Test Image 169, calculate a distortion mapping result (DMR) 700, and perform statistical analysis, including: Step 701: Calculate "should-be" or predicted position of undistorted grid dots pattern based on measured or known dimension of Distortion Target 28', and using a central dot or dots in Test Image 169 as a reference point or points; Step 703: Use an Illumination Threshold 174' to define pixels which represent a dot and pixels which represent background (e.g. if a pixel intensity value is less than Illumination Threshold 174' then pixel represents a part of or an entire grid dot); Step 705: Using image processing, find each grid dot centroid (e.g. for a pixel or a group of pixels which represent a grid dot, find a central location of that pixel or group of pixels); Step 707: Calculate a percentage displacement or difference from actual position of grid dots and "should be" (or known good) or predicted position as a distortion mapping across a Test Image 169, creating DMR 700; Step 709: Repeat over one, some or all frames of SUT 4 data captured (i.e. in Filename.avi 501) included in a user input phase data set (e.g., Phases from FIG. 9) and frequency set (e.g., Freqs from FIG. 9); Step 711: Generate a distortion analysis output using, e.g., average or mean squared of DMR 700 results from Step 707 versus vibration frequency (e.g., DC to 2 kHz) to analyze effect of relative motion within SUT 4. Another embodiment can show a comparison of effect of relative motion within SUT 4 by producing an output comprising a comparison of a said DRM results (e.g., percentage of displacement or difference from actual position of grid dots and "should be" (or known good) or predicted position for one, some or each grid dot) compared to a distortion or warping tolerance in certain applications such as ability to distinguish objects at a certain distance or a loss in resolution value when an image is captured by a camera. In some examples, a system or method can use DMR 700 results from Step 707 to create an analytical output, e.g., a DMR graph data shown as a function of vibration frequency (e.g., DC to 2 kHz) to analyze effect of relative motion within SUT Other distortion analysis are possible such as, e.g., correlating distortion mapping with structural modes of vibration that impact or create optical effects (e.g., distortion in different directions.)

Figure 12:
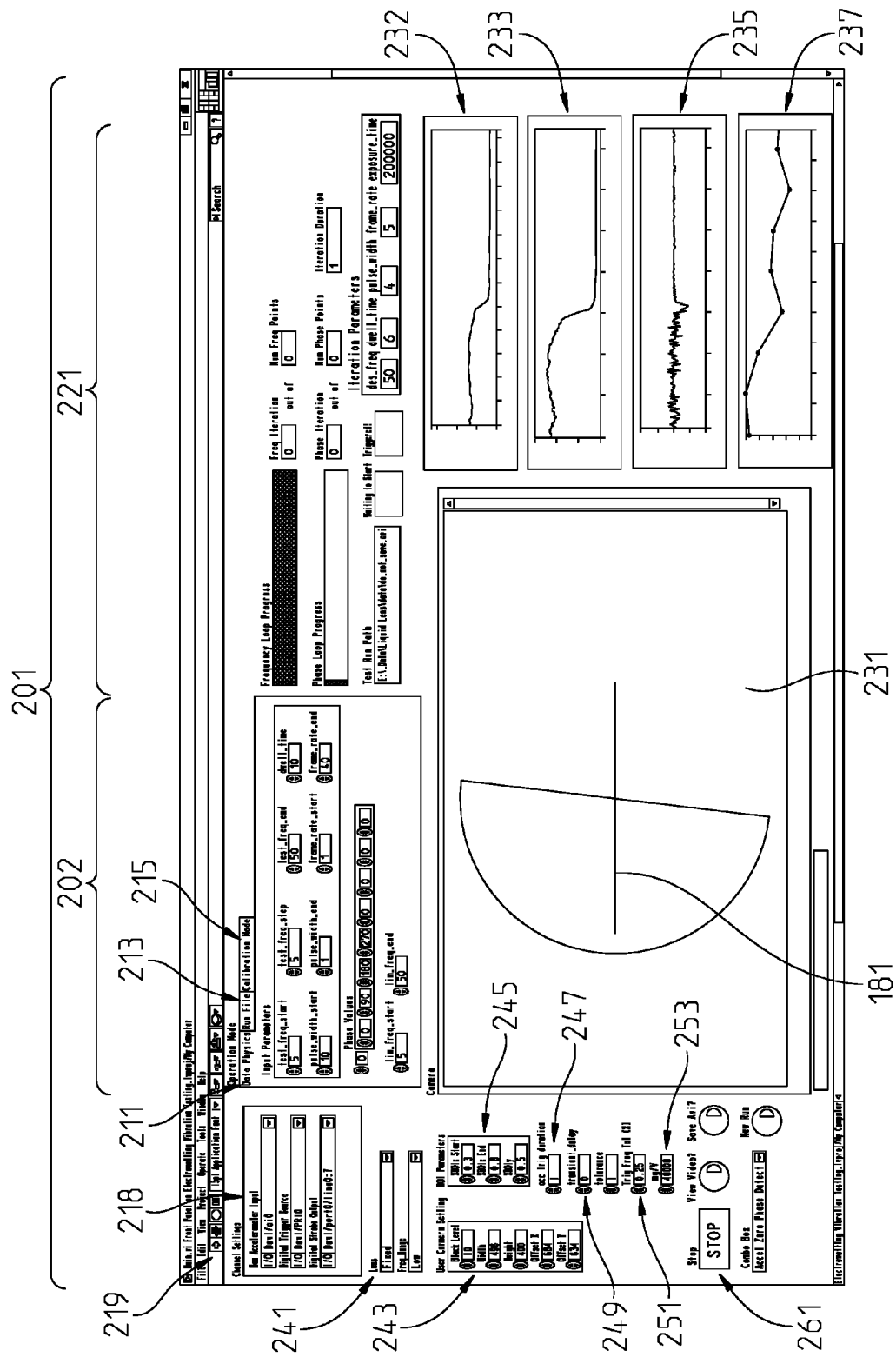
FIG. 12 shows a graphical user interface (GUI) in accordance with one exemplary embodiment of the invention.

FIG. 12 shows a GUI 201 in accordance with one exemplary embodiment of the invention. In particular, the GUI 201 includes a Channel Settings Section 218 which enables defining input and output channels for digital input from Zero Crossing Detector 33 output and analog input from Accelerometer Signal Buffer Output 129 as well as output to LED Driver 38; Operation Mode Section 202 which includes subsections Data Physics Mode 211 (displayed), Run File Mode 213 (see FIG. 13), and Calibration Mode 215 (see FIG. 14); a Test Information and Status Section 221; a User Camera Settings Section 243; an ROI Parameters Section 245; a Lens Type and Freq Range Section 241 that enables input of file descriptors in file name (e.g., filename.avi 501, see FIG. 10); and Camera Image Capture Output View 231 which includes a ROI line 181 on which data is processed real time or near real time as shown in Pixel Value over ROI 232, ESF 233, LSF 235 and MTF 237 plots. The GUI 201 also has a variety of data inputs for accelerometer signal processing and/or display including Accelerometer Trigger Duration 247 (e.g., used in a debouncing filter function which filters out noise or false trigger transitions in Zero Crossing Detector 33 output waveform 62 (see FIG. 7)), Transient Delay 249, Trigger Frequency Tolerance in Percentage 251 (used at Step 79B in FIGS. 8A and 8B to determine a match or no match tolerance). The GUI 201 also shows a Gain Input Value 253 (e.g. milli-g forces per volt) to convert accelerometer signal data to an actual acceleration unit of g-force. A Stop Button 261 is shown as well. A variety of information is shown in Test Information and Status section 221, described in detail in FIG. 17.

Figure 13:
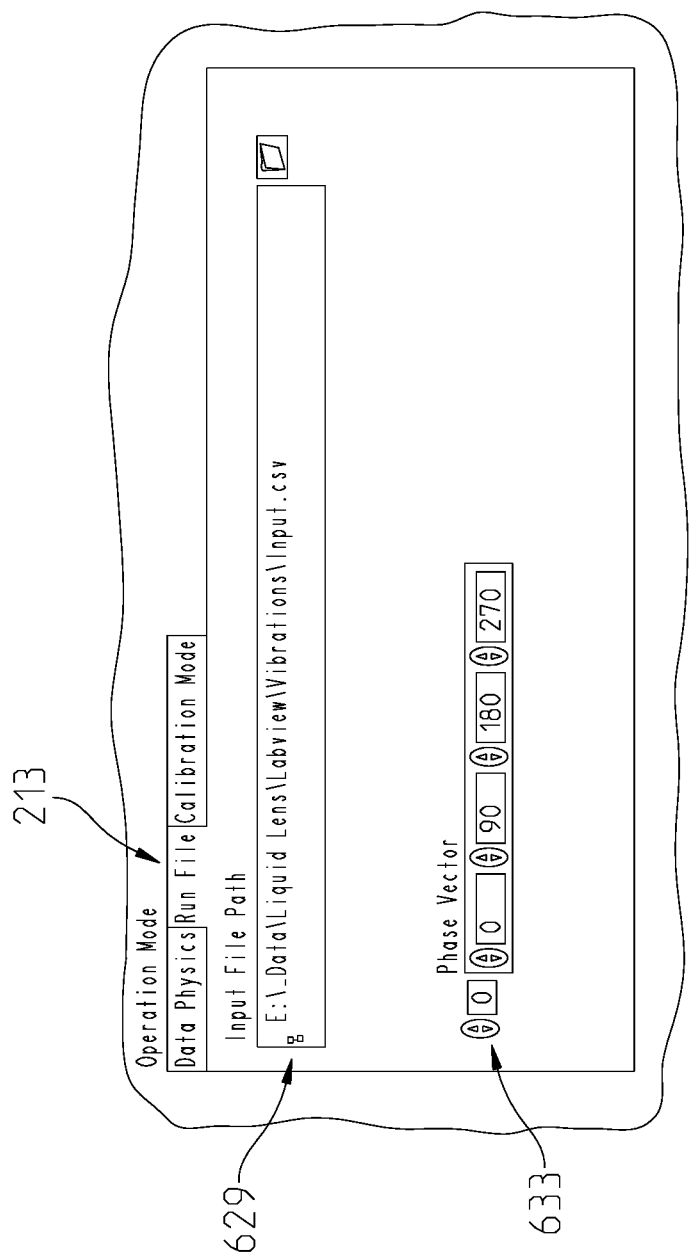
FIG. 13 shows an additional operation mode (run file) user interface tab extracted from a portion of the FIG. 12 GUI which is not selected (and thus not visible in exemplary FIG. 12)

FIG. 13 shows an exemplary subsection Run File Mode 213, an additional operation mode from a portion of the FIG. 12 Operation Mode Section 202 GUI which is not selected (and thus not visible). This subsection shows phase vector input 107. Input file path 629 is a path for a file that collects user input data from a comma separated variable formatted file for input into EOCC 51, Computer 51A with exemplary user inputs outlined in FIG. 9.

Figure 14:
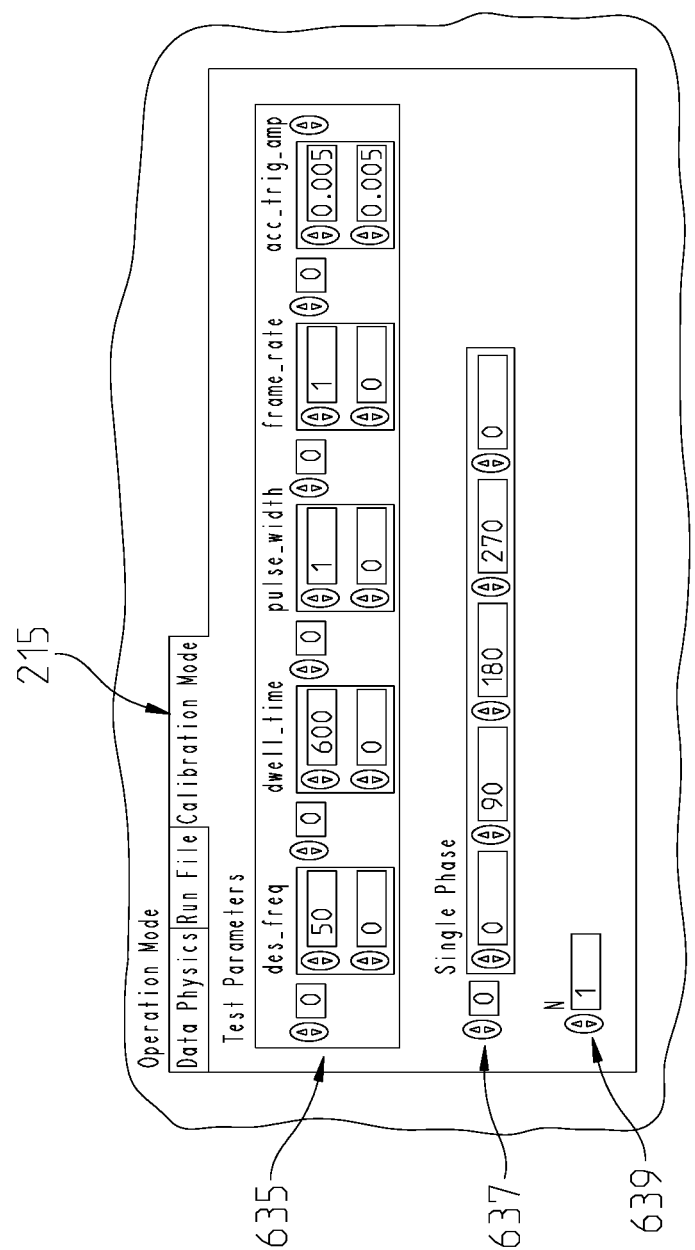
FIG. 14 shows another operation mode (calibration mode) user interface tab extracted from a portion of FIG. 12 GUI which is not selected (and thus not visible in exemplary FIG. 12)

FIG. 14 shows an exemplary subsection Calibration Mode 215, an additional operation mode from a portion of the FIG. 12 Operation Mode Section 202 GUI which is not selected (and thus not visible). This mode enables a user to enter user input data manually including Test Parameters 635, corresponding to desired Freqs 101, Dwell_Time 103, Pulse_Width 109, Frame_Rate 111, acc_trig_amp (accelerometer triggering amplifier value—used to debug false triggers associated with a frequency matching algorithm in FIGS. 8A and 8B, Step 79B, e.g., if under a voltage value—ensures system elements, e.g., data system, only operates when vibrational table is actually vibrating), Single Phase 637 inputs, and N (number of iterations) 639.

Figure 15:
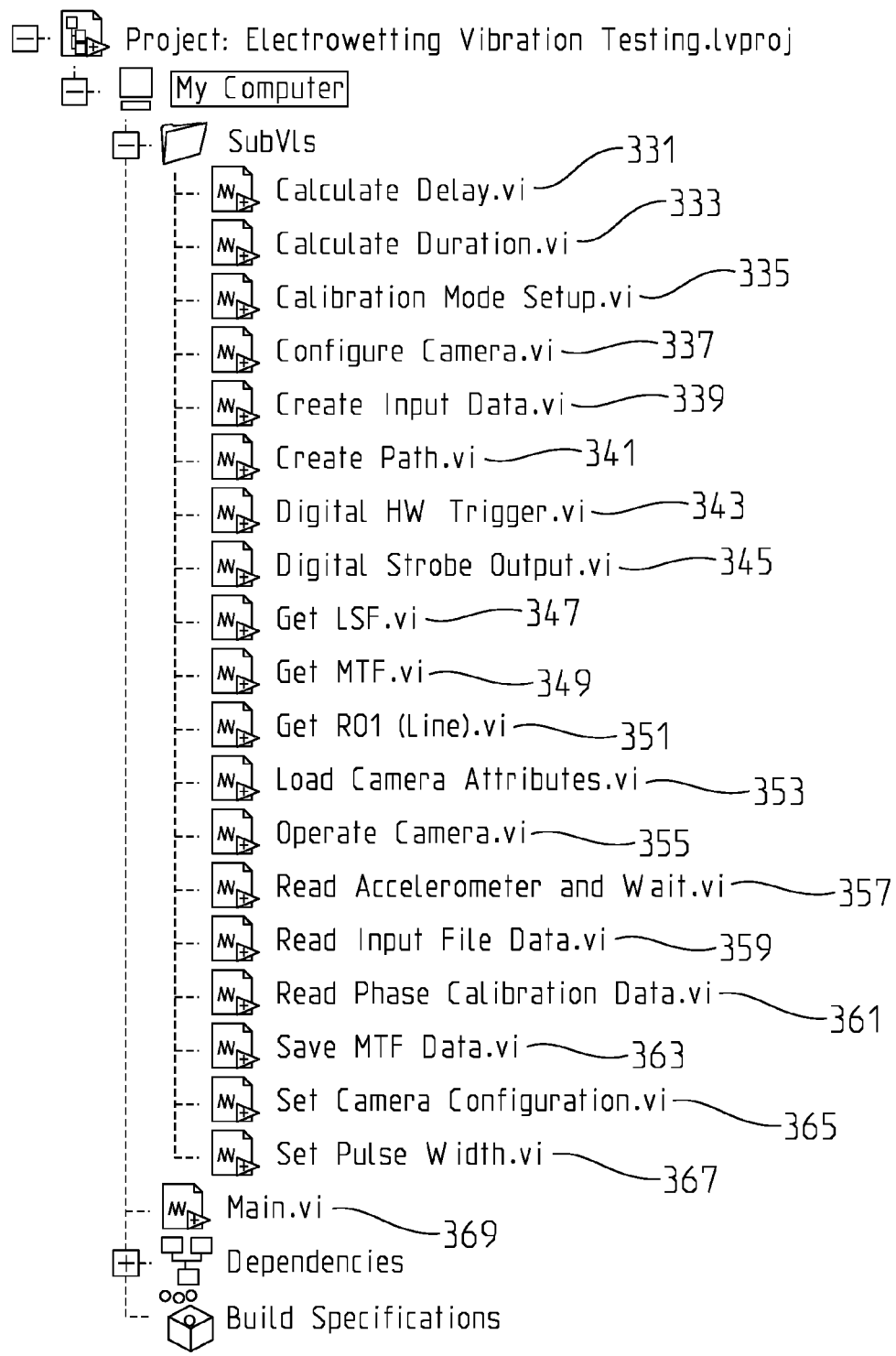
FIG. 15 shows an exemplary project view of a collection virtual instrument (VI) which represent exemplary software implemented functions or subroutines for performing various tasks in accordance with one embodiment of the invention.

FIG. 15 shows an exemplary project view of a collection VIs which represents exemplary software implemented functions or subroutines for performing various tasks in accordance with one embodiment of the invention. For example, control sections or VIs can include a graphical user interface selected programming blocks operable to Calculate Delay 331 (e.g., for ITS 55 phase delay Phases 107 control), Calculate Duration 333 (e.g., for ITS 55 pulse width Pulse_Widths 109 control), Calibration Mode Setup 335 (e.g., see GUI discussion in FIG. 14 detail description), Configure Camera 337 (e.g., for SUT 57 operation), Create Input Data 339 (e.g., to generate a run file for Run File Mode 213, see FIG. 13), Create Path 341 (e.g., to generate Filename.avi 501), Digital Hardware Trigger 343 (e.g., for ITS 55 synchronization with VLS 53), Digital Strobe Output 345 (e.g., for ITS 55 triggering), Get LSF 347 (e.g. line spread function of ROI 181 see FIG. 12), Get MTF 349 (e.g. MTF of ROI 181 see FIG. 12), Get ROI (line) 351 (e.g., retrieve ROI 181 data), Load Camera Attributes 353 (e.g., for SUT 57 operation), Operate Camera function 355 (e.g., for SUT 57 operation), Read Accelerometer and Wait 357 (e.g., for ITS 55 synchronization with VLS 53), Read Input Data File 359 (e.g., see GUI discussion in FIG. 13 detail description), Read Phase Calibration Data 361 (e.g., for ITS 55 synchronization with VLS 53), Save MTF Data 363 (e.g., for post-processing steps in FIG. 11), Set Camera Configuration 365 (e.g., for SUT 57 operation), and Set Pulse Width 367 ((e.g., for ITS 55 pulse width Pulse_Widths 109 control). Other elements include a Main VI 369, dependencies and a build specification section. Note in an alternative embodiment additional or different VIs can be included such as, e.g., VIs for executing post processing for distortion analysis such as described herein. In such a case, a Get Distortion Mapping Analysis VI can be added to Get MTF 349 or replace it. A different or additional VI can be included to operate a distortion mapping or analysis based ITS as well such as described herein.

In particular, exemplary VI Calculate Delay 331 determines Commanded Phase Delay 64 (see FIG. 7) by calculating an appropriate amount of time delay based on user input Freqs 101, Phases 107, relative to Signal 63—Software (in 51A, e.g., see FIGS. 2A and 2B) Trigger Point Setting—e.g., When Zero Crossing Detector Output 62 Goes High in FIG. 7. Exemplary VI Calculate Duration 333 determines an appropriate time to vibrate at each instance of Freqs 101 and Phases 107 by dividing Dwell_Times 103 by number of elements of Phases 107 and adjusting for Delay for Transient Decay 81 as shown in Step 84 (e.g., see FIGS. 8A and 8B). Exemplary VI Calibration Mode Setup 335 configures TCS 15 using a Calibration Mode subsection 215 of Operation Mode section 202 with inputs Test Parameters 635, and Single Phase 637, and N (number of iterations) 639 (e.g., see FIG. 14) for debugging and calibration in response to Actual Accelerometer Voltage Signal 60, or alternatively a function generator 17 to simulate Actual Accelerometer Voltage Signal 60, by using an oscilloscope 16 to verify operation of ITS 55, and SUT 57. Exemplary VI Configure Camera 337 changes camera settings and user inputs such as Frame_Rate 111 and Black_Level 113 as shown in Step 83 (e.g., see FIGS. 8A and 8B). Exemplary VI Create Input Data 339 builds arrays of inputs Freqs 101, Dwell_Times 103, Pulse_Widths 109, and Frame_Rates 111, based on Data Physics 211 GUI input (e.g., see FIG. 16). Exemplary VI Create Path 341 automatically generates new folders and file names according to Test Run Path 605 and Filename.avi 501 (e.g., see FIG. 10). Exemplary VI Digital HW Trigger 343 configures Data Acquisition Board 32 to receive Zero Crossing Detector 33 Output Signal 62 and generates Software (in 51A) Trigger Point Setting—e.g., When Zero Crossing Detector Output 62 Goes High 63 output waveform (e.g., see FIG. 7) (i.e., software function which performs Step 87 HW Trigger in FIGS. 8A and 8B). Exemplary VI Digital Strobe Output 345 configures Data Acquisition Board 32 and executes LED Pulse Control Voltage Signal 66 (e.g., at commanded phase delay from Phases 107 and with commanded pulse width from Pulse_Widths 109) as shown in Step 87 (e.g., see FIGS. 8A and 8B). Exemplary VI Get LSF 347 calculates a line spread function from a selected ROI 181 in a center of the captured image at Step 91 (e.g., see FIGS. 8A and 8B) and shown in the GUI LSF 235 (e.g., see FIG. 12). Exemplary VI Get MTF 349 calculates a MTF result from a selected ROI 181 in the center of the captured image at Step 91 (e.g., see FIGS. 8A and 8B) and shown in GUI MTF 237 (e.g., see FIG. 12). Exemplary VI Get ROI (Line) 351 allows a user to select a line, according to ROI parameters 245 user input (e.g., see FIG. 12) to calculate LSF and MTF in Step 91 (see FIGS. 8A and 8B) and displays ROI line 181 in Camera Image Capture Output 231 (e.g., see FIG. 12). VI Load Camera Attributes 353 reads formatted user input camera configuration data that is then used in exemplary VI Configure Camera 337 as shown in Step 83 (e.g., see FIGS. 8A and 8B). VI Operate Camera 355 calls VI Configure Camera 337, VI Get ROI (Line) 351, VI Get LSF 347, exemplary VI Get MTF 349, VI Save MTF Data 363, VI Set Camera Configuration 365 to complete steps 89 and 91 (e.g., see FIGS. 8A and 8B). Exemplary VI Read Accelerometer and Wait 357 (e.g., wait element is used to address certain engineering problems in making this embodiment function in view of noise, and other parameters) calls exemplary VI Digital HW Trigger 343 to complete Step 77 (e.g., see FIGS. 8A and 8B). Exemplary VI Read Input File Data 359 opens a data file identified by Input File Path 629 returns Test Parameters 635 (see FIG. 14) used in Step 73 (e.g., see FIGS. 8A and 8B). Exemplary VI Save MTF Data 363 writes MTF data to a comma separated value file based on a path determined in 605. Exemplary VI Set Camera Configuration 365 enables desired input camera parameters (e.g., Frame_Rate 111 and Black_Level 113) to be used by exemplary VI Configure Camera 337. Exemplary VI Set Pulse_Width 367 takes in user input Pulse_Widths 109, see FIG. 9, sets Commanded Phase Delay 65 (e.g., see FIG. 7), and determines a LED Pulse Control Voltage Signal 66 (e.g., see FIG. 7). Again, note in an alternative embodiment additional or different Vis can be included such as, e.g., VIs for executing post processing for distortion analysis or DMR analysis such as described herein. In such a case, a Get Distortion Mapping Analysis VI can be added to Get MTF 349 or replace it. A different or additional VI can be included to operate a distortion mapping/DMR analysis based ITS as well such as described herein.

Figure 16:
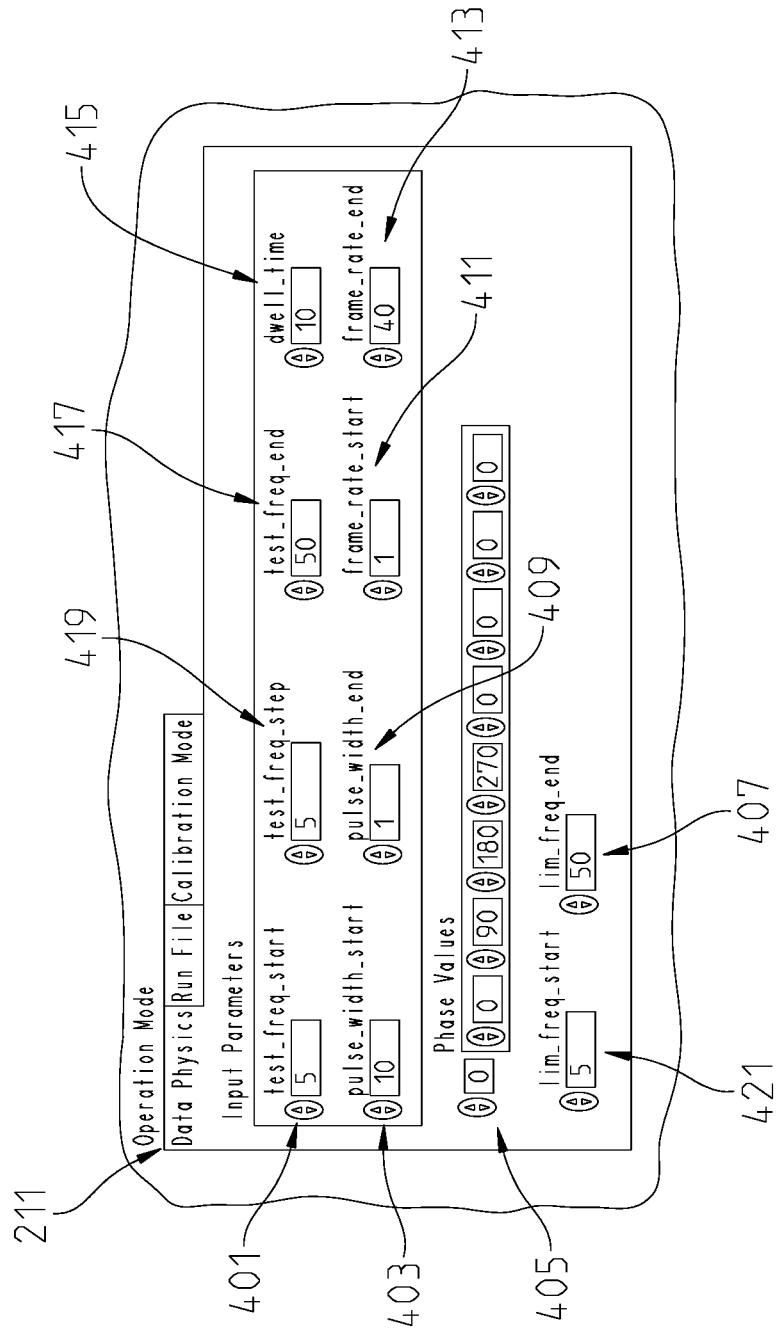
FIG. 16 shows a detail view of a section of the exemplary FIG. 12 GUI showing a Data Physics 211 user input fields tab associated with an Operations Mode section 202 user interface.

FIG. 16 shows an exemplary detail view of a section of the FIG. 12 GUI showing a Data Physics 211 User Input Fields tab associated with an Operations Mode section 202 user interface. In particular, Data Physics 211 user input fields test_freq_start 401, test_freq_step 419, test_freq_end 417, dwell_time 415, pulse_width_start 403, pulse_width_end 409, frame_rate_start 411, frame_rate_end 413, Phase Values 405, lim_freq_start 421, and lim_freq_end 407 as shown in Step 73 (e.g., see FIGS. 8A and 8B).

Figure 17:
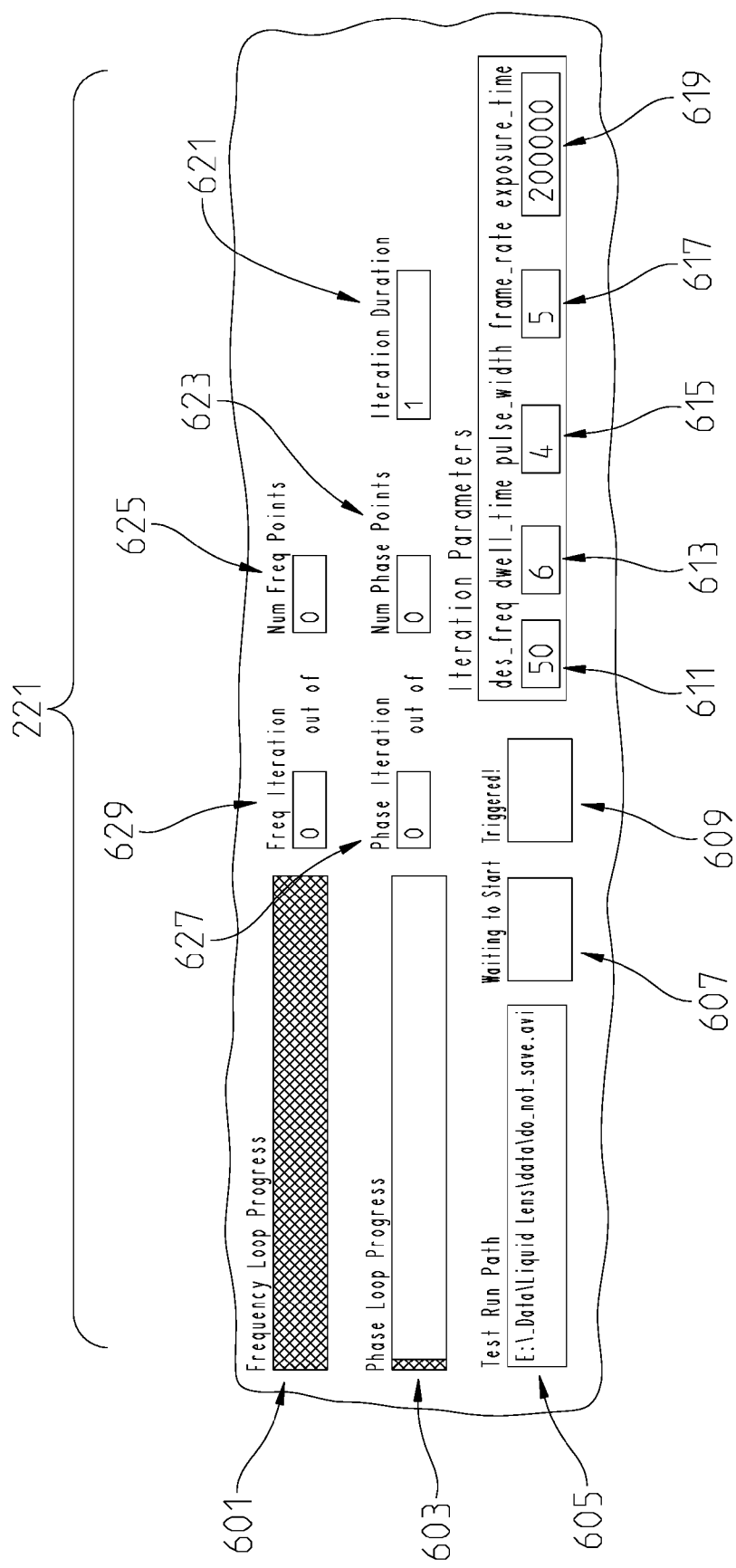
FIG. 17 shows a detail view of a section of the exemplary FIG. 12 GUI showing a Test Information and Status section 221 user interface.

FIG. 17 shows a detail view of a section of the FIG. 12 GUI showing a Test Information and Status section 221 user interface. In particular, Frequency Loop Progress 601, Phase Loop Progress 603, Test Run Path 605, Waiting to Start indicator 607, Triggered indicator 609, Iteration Parameters including des_freq 611, dwell_time 613, pulse_width 615, frame_rate 617, and exposure_time 619 (corresponding to user inputs such as described in FIG. 9), Iteration Duration 621, Num Phase Points 623, Freq iteration 629, Number of Freq Points 625, Phase Iteration 627, and Number of Phase Points 623.

Another alternate embodiment can include providing an exemplary embodiment of the invention and collecting data e.g., see FIGS. 8A and 8B; isolating blurring of vibration on SUT 4' (or SUT 4) using strobe to "freeze" image; using bandwidth (e.g., −3 dB cyc/mrad) of MTF; and compare imaging performance of the SUT 4' (or SUT 4) (e.g., see FIG. 1A) (e.g., −3 dB cyc/mrad) (e.g., fifty percent spatial frequency point of a MTF value) during vibration of the SUT 4' (or SUT 4) having one type of lens e.g., liquid lens 273 with another SUT, e.g., SUT 4 having another type of lens as a reference e.g., Glass Lens 271 (e.g., see FIG. 1A).

An alternate embodiment can include placement of elements of the invention on a structure besides a Vibration Table 1 such as an actual end application. For example, a case where an embodiment of the invention should be needed to be mounted on a structure that has a different vibrational loading than the item or element which is being evaluated for its ability to operate under vibrational loading. For example, an aircraft can have a sensor mounted on a pylon which has different vibration loading than another section of the aircraft such as the fuselage. Another alternative embodiment can employ wireless connection between components or an alternative sensor such as a laser vibrometer which measures relative movement such as acceleration or displacement between exemplary SUT 4 and other elements such as ITS 55 which is sending light inputs into SUT 4.

Generally, one approach to employment of one exemplary embodiment of the invention can include providing an embodiment of the invention to produce test results which are then used to compare imaging performance of a SUT optical element 4 during vibration with a calibrated or known lens (e.g., a Reference Glass Lens 271) performance. For example, an embodiment of invention can include placing portions of test equipment that are not connected or physically fixed with respect to SUT 4 with an exemplary architecture that permits isolation of blurring of vibration loading applied to an optical element of the SUT 4 using a synchronization architecture which includes systems that strobe to "freeze" image in particular positions of vibration loading. Embodiments of the invention can be used in testing using bandwidth (−3 dB cyc/mrad) of a MTF.

One consideration for formulating one exemplary embodiment is a decision on whether or not to include arbitrary or specific phase measurements. For example, determining to include multiple phase measurements provides a method to measure optical effects caused by pertubation of SUT 4 lens surface or structural displacement of SUT 4 optical elements as a function of acceleration. Some embodiments of this invention include multiple phase measurements at specific values rather than a single specific value or arbitrary value. For example, certain modes of vibration within a lens element could be determined by proper choice of target in ITS 55 (i.e. an illuminated calibrated grid could determine the warping effect of a Lens 273, which may correspond to deformation caused by vibrational effects).

Various embodiments can include combinations of elements described herein such as combining different types of ITS systems, e.g., 55, 55' and MTF related (e.g., FIGS. 2A and 2B, FIG. 11) and DMR related (e.g., FIG. 2C, FIG. 11A) processing or post processing. In this embodiment, different ITS systems (e.g., 55, 55') can be either concurrently mounted spaced apart but capable of directing their light outputs into SUT 4 or a system can be designed to permit selective movement or positioning of each different ITS (e.g., a quick release or selective couplings to permit swapping of different ITS from a single mounting position, etc). Another embodiment can enable selective operation of different ITS structures in different ITS control modes using, e.g., user selectable mode selection elements (e.g., a GUI based selection, command prompt which enables switching between ITS modes (e.g., operating ITS 55 or 55' alternatively).

Although the invention has been described in detail with reference to certain preferred embodiments, variations and modifications exist within the spirit and scope of the invention as described and defined in the following claims.

The invention claimed is:

1. A testing system comprising:
a first support structure;
a second support structure;
at least one display;
a vibration loading system (VLS) operable to generate vibrational loading, said VLS is supported by said first support structure, wherein said VLS further comprises a vibration isolation structure adapted to enable lateral movement of a VLS support section and attenuate or reduce vibration transmitted from said VLS to said first support structure;
a VLS control system section comprising a first recording medium section configured to store a first plurality of non-transitory machine readable instruction configured to control said VLS based on a first plurality of user inputs comprising one or more frequency of vibration associated with one or more VLS table vibration instances specified in cycles of said VLS per unit of time, a dwell time for each said one or more frequency, and an amplitude of acceleration or position at each said one or more said one or more frequency;
a mounting structure adapted to receive a System Under Test (SUT) comprising an optical element and imaging system configured to receive light through or reflected off said optical element, said mounting structure couples the SUT with the VLS support structure, wherein said mounting structure includes a first and second clamp section each having a recessed section facing the SUT configured to receive an adjustable focus ring section of said optical element so as to apply clamping force on optical element areas adjacent to said focus ring while said optical element is clamped within said mounting structure;
a first acceleration sensor coupled with the VLS configured to provide VLS acceleration data;
a first Illumination Target System (ITS) comprising a light source configured to generate and pass ITS light through said optical element, said first ITS is supported by the second support structure, said second support structure is spaced apart from said first support structure, wherein said first ITS further comprises a distortion target comprising a transparent glass with a fixed spacing grid or pattern of light absorbing or opaque structures;
a Test Control System (TCS) comprising a signal buffer configured to receive said VLS acceleration data, a band pass filter receiving inputs from said signal buffer, and amplifier receiving inputs from said band pass filter, and a zero crossing detector receiving inputs from said amplifier that outputs a trigger signal output when said amplifier signal is above or below a first voltage threshold, said TCS further comprising a light source driver generating a power signal to said ITS to power and control said light source, wherein said first acceleration sensor provides said VLS acceleration data;
an Electro-Optics Control Computer (EEOC) section comprising a data acquisition section coupled to said signal buffer and said zero crossing detector, said EEOC further comprising a second recording medium section configured to store a second plurality of non-transitory machine readable instructions configured for controlling said EEOC section, said TCS, and said imaging system based on said trigger signal output from said zero crossing detector, said signal buffer output receiving said acceleration data, one or more frequency of vibration, said dwell time, and a second plurality of user inputs, said second plurality of user inputs comprising one or more phase delays of vibration cycle to ITS pulse occurrence defining a phase delay between vibration cycle start and an activation of said ITS light output, a pulse width defining a duration of operation for said ITS light output, a frame rate for image capture from said imaging system, and a black level for defining a low light pixel signal value added to all said imaging system's pixel output to adjust for pixel outputs below a first signal intensity measurement level to avoid clipping said pixel outputs below said first signal intensity measurement level and zero output from one or more of said imaging system's pixels, wherein said EEOC synchronizes said light source driver with VLS position based on said zero crossing detector output, wherein said EEOC section further configured for recording a plurality of test data from said imaging system; and
a processing section configured for real-time or post-processed optical characterization of said test data comprising images from each said image capture, generating a first plurality of analyses outputs on said images comprising generating a first distortion analysis output to create a distortion mapping result (DMR) analytical output comprising a percentage difference or displacement from imaged said grid or pattern of light absorbing or opaque structures compared to positions of said grid or pattern of light absorbing or opaque structures, storing said DMR analytical output, creating a second distortion analysis output comprising said DMR analytical output shown in a graph on said display as a function of vibration frequency, creating a third distortion analysis output comprising a comparison of said DMR analytical output with a predetermined distortion or warping tolerance in predetermined applications comprising a measurement of a predetermined human capacity for distinguishing said images of objects viewed through said SUT at a predetermined distance or a predetermined resolution value.

2. A testing system as in claim 1, wherein said first ITS opaque structures comprises dots.

3. A testing system as in claim 1, further comprising an electronics control system coupled with said SUT to control zoom or focus of said SUT, said ECS is electrically coupled with said EOCC.

4. A testing system as in claim 1, wherein said optical element comprises a liquid lens.

5. A testing system as in claim 1, wherein said optical element comprises a glass lens.

6. A testing system as in claim 1, wherein said first and second light sources comprises a light emitting diode (LED) or a flash lamp.

7. A testing system as in claim 1, wherein said data acquisition board comprises a field programmable gate array (FPGA), a plurality of electrical components comprising an analog to digital (A/D) signal converter, a digital to analog (D/A) signal converter, as well as a plurality of electrical interface connections.

8. A testing system as in claim 1, further comprising a second ITS system configured to generate said ITS light output and operate in place of said first ITS in cooperation with VLS, SUT, EEOC, and TCS in a second operating configuration, said second ITS comprising a second light source configured to generate said ITS light output and pass said ITS light output through said optical element, said second ITS is supported by the second support structure, wherein said second ITS further comprises a straight edge structure positioned over said second light source in said second ITS oriented towards said SUT, said straight edge structure is configured to create a transition in said ITS light comprising a first section with a first intensity and a second section with a second intensity, wherein said processing section further comprises another section configured for calculating a modulation transfer function (MTF) data result and frequency response analysis, and displaying MTF related results analysis of said MTF and frequency response analyses on said images on said display.

9. A testing system as in claim 8, wherein said straight edge structure comprises a half moon target structure.

10. A testing system as in claim 8 wherein said processing system includes a third plurality of non-transitory machine readable instructions comprising instructions for controlling said EEOC to perform analysis of images from said image captures including a still imagery or a frame of a video sequence of said light through said optical element including analyzing each row of each of said images and perform statistical and histogram analysis, calculating instantaneous field of view of said SUT using a calibrated image that contains a known dimension comprising a dimension of said ITS or a ruler to obtain a calibration value in radians/pixel, using an illumination threshold to define a region of interest (ROI) in said images, applying a ROI to one or more said images to center on an edge pattern of said ITS straight edge in a respective one or more said images, calculating said MTF data result of each row in the ROI to provide optical characterization data of test image sharpness in terms of resolution value or values including cycles per milliradian, blur or clarity of image, and ability to distinguish and identify elements in an image, repeating over one, some or all frames of the images included in a user input phase data set including said phases and said frequency values, and using said MTF data as a function of said vibration frequency to analyze effect of relative motion within said SUT such as comparing a needed resolution versus actual resolution.

11. A testing system as in claim 8, wherein said results of said MTF related analysis include a display of MTF bandwidth showing spatial frequency at which one or more MTF values reaches a predetermined percentage of a maximum MTF value for each said frequency of vibration.

12. A system as in claim 11, wherein said predetermined percentage of said maximum MTF value is fifty percent or −3 decibels for each said frequency of vibration.

13. A system as in claim 11, wherein said results of said analysis include a display of MTF bandwidth showing spatial frequency at which one or more MTF values reaches a predetermined percentage of a maximum MTF value for each said amplitude.

14. A system as in claim 11, wherein said predetermined percentage of said maximum MTF value is fifty percent or −3 decibels for each said amplitude.

15. A system as in claim 11, wherein said means for fixing said SUT couples the SUT with the vibrational loading means, said means for fixing said SUT receives an adjustable focus ring section of said optical element so as to apply clamping force on optical element areas adjacent to said focus ring.

16. A testing system comprising:
a means for vibrational loading (MVL) including lateral sinusoidal movement;
a means for controlling said MVL based on a first plurality of user inputs comprising one or more frequency of vibration associated with one or more MVL vibration instances specified in cycles of said MVL per unit of time, a dwell time for each said one or more frequency, and an amplitude of position or acceleration for each said one or more said one or more frequency;
a means for fixing a system under test (SUT) to said MVL, said SUT comprising an optical element and an imaging system coupled with said optical element to receive light through said optical element;
a means for detecting acceleration from said MVL and outputting a first acceleration signal;
an illumination target (IT) means comprising a light source configured to generate and pass light through said optical element, said IT means partially blocks said light source and generates a pattern of said light comprising a plurality of equally spaced grid patterned light having first and second light intensities;
a test control (TC) means for processing said first acceleration signal to generate a trigger signal produced when said first acceleration signal is at a first voltage threshold and generate a light source activation signal for operating said IT means;
an electro-optics control (EOC) means for controlling said TC means, said imaging system of said SUT based in part on said trigger signal, said one or more frequency of vibration, said dwell time, and a second plurality of user inputs, said second plurality of user inputs comprising one or more phase delays of vibration cycle to IT means pulse occurrence defining a phase delay between vibration cycle start and an activation of said light source, a pulse width defining a duration of operation for said light source, a frame rate for image capture from said imaging system, and a black level for defining a low light pixel signal value added to all said imaging system's pixel output, wherein said EOC synchronizes said light illumination means output with said MVL loading based on said trigger signal, wherein said EOC section further configured for recording a plurality of test data from said imaging system; and
a processing means for real-time or post-processed optical characterization of said test data comprising images from each said image capture, performing analyses on said images comprising means for generating a SUT distortion analysis output using distortion mapping results to create an analytical output comprising graph data shown as a function of vibration frequency to show a determination of effect of relative motion within at least said optical element based on comparing a predetermined warping tolerance in predetermined applications comprising a measurement of a predefined human capability for distinguishing objects in image outputs from said SUT at a predetermined distance or a predetermined resolution value, and displaying results of said analyses of said images on said display comprising said measurement of said predefined human capability for distinguishing objects in said image outputs or a resolution metric of said images.

17. A system as in claim 16, wherein said first voltage threshold corresponds to a predetermined position or acceleration of the means for vibrational loading.

18. A system as in claim 16, wherein said first voltage threshold associated with said first acceleration signal from said first accelerometer is sensed by said TC means when said vibrational loading means changes lateral direction or the first acceleration signal goes from negative to positive signal values.

19. A system as in claim 16, wherein said light source comprises a light emitting diode (LED).

20. A system as in claim 16, wherein said means for creating a transition in said light comprises a straight edge structure.

21. A system as in claim 16, wherein said means for creating a transition in said light comprises a half moon structure positioned on said light source.

22. A system as in claim 16, wherein said means for creating a transition in said light comprises a distortion target comprising a transparent glass with a fixed spacing grid or pattern of light absorbing or opaque structures.

23. A testing system as in claim 16, wherein said processing system includes a third plurality of non-transitory machine readable instructions comprising instructions for controlling said EEOC to perform analysis of images from said image captures including a still imagery or a frame of a video sequence of said light through said optical element including analyzing each position of a grid dot in an imaged distortion pattern, calculating a distortion mapping result, performing at least one statistical analysis of said distortion mapping result, calculating a predicted position of grid dots based on one or more measured or known dimension comprising a dimension of said ITS or a ruler to obtain a calibration value in radians/pixel), using an illumination threshold to define a region of interest (ROI) in said images, applying said ROI to one or more said images to center on an edge pattern of said ITS straight edge in a respective one or more said images, using at least one image processing machine readable instruction set to find grid dot centroids in said one or more said images, calculating a percentage displacement from an actual position of said grid dots and a predicted position of said grid dots as a mapping across said image, repeating over one, some or all frames of the images included in a user input phase data set including said phases and said frequency values, and using said distortion mapping result as a function of said vibration frequency to analyze and determine effects of relative motion within said SUT such as comparing a predetermined needed resolution versus actual resolution of said one or more images.

24. A method of testing providing a testing system comprising:
a first support structure;
a second support structure;
at least one display;
a vibration loading system (VLS) operable to generate vibrational loading, said VLS is supported by said first support structure, wherein said VLS further comprises a vibration isolation structure adapted to enable lateral movement of a VLS support section and attenuate or reduce vibration transmitted from said VLS to said first support structure;
a VLS control system section comprising a first recording medium section configured to store a first plurality of non-transitory machine readable instruction configured to control said VLS based on a first plurality of user inputs comprising one or more frequency of vibration associated with one or more VLS table vibration instances specified in cycles of said VLS per unit of time, a dwell time for each said one or more frequency, and an amplitude for each said one or more frequency;
a mounting structure adapted to receive a System Under Test (SUT) comprising an optical element and imaging system configured to receive light through said optical element, said mounting structure couples the SUT with the VLS support structure, wherein said mounting structure includes a first and second clamp section each having a recessed section facing the SUT configured to receive an adjustable focus ring section of said optical element so as to apply clamping force on optical element areas adjacent to said focus ring while said optical element is clamped within said mounting structure;
a first acceleration sensor coupled with the VLS configured to provide VLS acceleration data;
a first Illumination Target System (ITS) comprising a light source configured to generate and pass light through said optical element, said first ITS is supported by the second support structure, said second support structure is spaced apart from said first support structure, wherein said first ITS further comprises a distortion target comprising a transparent glass with a fixed spacing grid or pattern of light absorbing or opaque structures;
a Test Control System (TCS) comprising a signal buffer configured to receive said VLS acceleration data, a band pass filter receiving inputs from said signal buffer, and amplifier receiving inputs from said band pass filter, and a zero crossing detector receiving inputs from said amplifier that outputs a trigger signal output when said amplifier signal is above a first voltage threshold, said TCS further comprising a light source driver generating a power signal to said ITS to power and control said light source, wherein said first acceleration sensor provides said VLS acceleration data;
an Electro-Optics Control Computer (EEOC) section comprising a data acquisition section coupled to said signal buffer and said zero crossing detector, said EEOC further comprising a second recording medium section configured to store a second plurality of non-transitory machine readable instructions configured for controlling said EEOC section, said TCS, and said imaging system based on said trigger signal output from said zero crossing detector, said signal buffer output receiving said acceleration data, one or more frequency of vibration, said dwell time, and a second plurality of user inputs, said second plurality of user inputs comprising a list of one or more phase delays of vibration cycle to ITS pulse occurrence defining a phase delay between vibration cycle start and an activation of said light output from said ITS, a pulse width defining a duration of operation for said light that is output from said ITS, a frame rate for image capture from said imaging system, and a black level for defining a low light pixel signal value added to all said imaging system's pixel output to adjust for pixel outputs below a first signal intensity measurement level to avoid clipping said pixel outputs below said first signal intensity measurement level and zero output from one or more of said imaging system's pixels, wherein said EEOC synchronizes said light source driver with VLS position based on said zero crossing detector output, wherein said EEOC section further configured for recording a plurality of test data from said imaging system;
a processing section configured for real-time or post-processed optical characterization of said test data comprising images from each said image capture, said post processing section comprising a plurality of non-transitory machine readable instructions stored on a non-transitory storage medium configured for performing analyses on said images comprising generating a first distortion analysis output to create a distortion mapping result (DMR) analytical output comprising a percentage difference or displacement from imaged said grid or pattern of light absorbing or opaque structures compared to positions of said grid or pattern of light absorbing or opaque structures, storing said DMR, creating a second distortion analysis output comprising said DMR data shown in a graph on said display as a function of vibration frequency, creating a third distortion analysis output comprising a comparison of said DMR data with a predetermined distortion or warping tolerance in predetermined applications comprising distinguishing objects viewed through said SUT at a predetermined distance or a predetermined resolution value;

inputting said first and second plurality user inputs into said VLS control system and said EEOC system;

running one or more VLS sequences in accordance with a plurality of control instructions stored on said EEOC or said VLS control system based on said first and second plurality of user input data, said VLS sequence comprises control instructions to operate VLS to ramp up said VLS to a predetermined acceleration amplitude and frequency and then wait at that amplitude for an appropriate dwell time using said first accelerometer for feedback control; then decelerate down to rest; then increments to a next value in said first plurality of user inputs and repeating at least some of programmed control instructions based on a set of incremented values;

reading accelerometer amplitude and frequency comprising determining if a measured VLS frequency matches a selected said frequency of vibration, wherein if a match exists, then execute a delay for a transient delay time or if no, recommence processing;

setting said first ITS and said SUT imaging system parameters;

calculating image capture time for controlling the SUT imaging system using said dwell time, said transient delay time, and a number of phase values in said list of said phase delays;

incrementing to next a value in a list of said list of phase values comprising a phase vector;

operating said light source to generate strobed said light source output at a respective user input phase delay value with said trigger signal from said zero crossing detector with a non-transitory machine readable instruction or software defined delay and pulse width control;

capturing and saving said images received through said SUT optical element and captured by said imaging system for a duration of time equal to image capture time defined by said dwell time divided by a number of phases in said phase values minus said transient delay; and executing said post processing section to generate said first, second and third distortion analysis output.

25. A method as in claim 24 further comprising a second ITS system configured to generate a different said ITS light output and operate in place of said first ITS in cooperation with VLS, SUT, EEOC, and TCS in a second operating configuration, said second ITS comprising a second light source configured to generate said different said ITS light output and pass said different said ITS light output through said optical element, said second ITS is supported by the second support structure, wherein said second ITS further comprises a straight edge structure positioned over said second light source in said second ITS oriented towards said SUT, said straight edge structure is configured to create a transition in said second ITS light source comprising a first section with a first intensity and a second section with a second intensity, wherein said processing section further comprises another non-transitory machine readable instruction section configured for calculating a modulation transfer function (MTF) data result and frequency response analysis, and displaying MTF related results analysis of said MTF and frequency response analyses on said images on said display, said method further comprising calculating and displaying edge spread function (ESF) and line spread function (LSF), then displaying said ESF and LSF onto a graphical user interface.

* * * * *